(12) United States Patent
Hughes et al.

(10) Patent No.: US 9,189,495 B1
(45) Date of Patent: Nov. 17, 2015

(54) REPLICATION AND RESTORATION

(75) Inventors: Jeffrey Douglas Hughes, Seattle, WA (US); Harsha Srinivas Mahuli, Sammamish, WA (US); Darrick Peter Lew, Seattle, WA (US)

(73) Assignee: EMC CORPORATION, Hopkinton, MA (US)

( * ) Notice: Subject to any disclaimer, the term of this patent is extended or adjusted under 35 U.S.C. 154(b) by 493 days.

(21) Appl. No.: 13/536,519

(22) Filed: Jun. 28, 2012

(51) Int. Cl.
  *G06F 17/30* (2006.01)

(52) U.S. Cl.
  CPC .... *G06F 17/30194* (2013.01); *G06F 17/30215* (2013.01)

(58) Field of Classification Search
  CPC .................. G06F 17/30194; G06F 17/30575; G06F 17/30215; G06F 17/30073
  USPC ......................................................... 707/639
  See application file for complete search history.

(56) References Cited

U.S. PATENT DOCUMENTS

| | | | |
|---|---|---|---|
| 7,653,699 B1 * | 1/2010 | Colgrove et al. | 709/213 |
| 7,809,691 B1 * | 10/2010 | Karmarkar et al. | 707/674 |
| 8,341,363 B2 | 12/2012 | Chou et al. | |
| 2003/0182301 A1 * | 9/2003 | Patterson et al. | 707/102 |
| 2004/0139128 A1 * | 7/2004 | Becker et al. | 707/204 |
| 2006/0179061 A1 * | 8/2006 | D'Souza et al. | 707/10 |
| 2011/0010392 A1 * | 1/2011 | Wong et al. | 707/776 |
| 2011/0060887 A1 * | 3/2011 | Thatcher et al. | 711/171 |
| 2011/0258461 A1 | 10/2011 | Bates | |

OTHER PUBLICATIONS

Official Communication received for U.S. Appl. No. 13/452,491 mailed Dec. 31, 2013.

* cited by examiner

*Primary Examiner* — Shiow-Jy Fan
(74) *Attorney, Agent, or Firm* — Sean Evans; Jason Reyes; Krishnendu Gupta

(57) ABSTRACT

Embodiments are directed towards replication and restoration of file system objects stored on file system clusters. Modified file system objects may be tracked using a snapshot tracking file corresponding to a snapshot. The snapshot tracking file may be employed to generate a snapshot change set. The snapshot change set may be used to restore a file system cluster to a version corresponding to a snapshot by reversing the changes in the snapshot change set. Also, a snapshot change set may be used to replicate file system objects by committing the included changes on another file system cluster. If a primary file system cluster becomes unavailable the file system may failover to the secondary file system cluster. If the primary file system cluster later becomes available it may be restored by using snapshot change sets generated on the secondary file system cluster.

18 Claims, 16 Drawing Sheets

REPLICATION AND RESTORATION

TECHNICAL FIELD

The various embodiments relate generally to managing storage of files in a distributed file system and more particularly to, improving performance by enabling replication and restoration of file systems in a distributed computing environment.

BACKGROUND

High performance computing environments often require distributed high performance file systems. Such file systems may be responsible for storing and managing access to millions of files. In some cases, such file systems may have to provide files for thousands, or even millions of simultaneous users.

Supporting robust replication and restoration operations are important requirements for high performance file systems. Typically, distributed file systems may employ backup systems that mirror the data stored on the primary file system. However, for long running backup processes in operating in high performance computing environments backup and mirroring processed may be interrupted in the middle of the backup and/or restoration process. Such interruption may create inconsistent backups that may be difficult to or impossible to generate accurate point-in-time restorations. Thus, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Description Of The Various Embodiments, which is to be read in association with the accompanying drawings, wherein.

DESCRIPTION OF THE VARIOUS EMBODIMENTS

Figure 1:
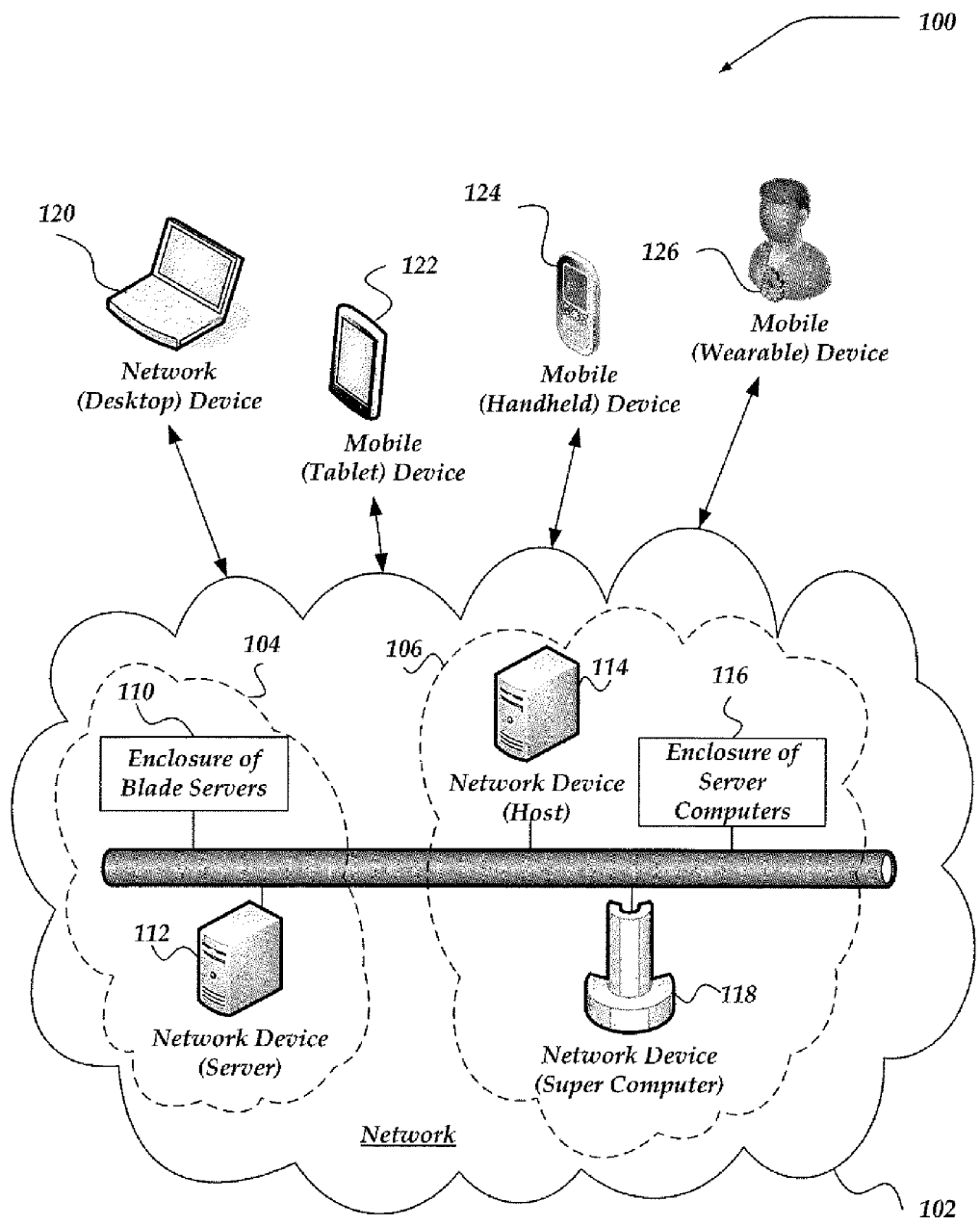
FIG. 1 illustrates a system environment in which various embodiments may be implemented.

The invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

For example embodiments, the following terms are also used herein according to the corresponding meaning, unless the context clearly dictates otherwise.

The term "inode," as used herein refers to data structures that may store information, or meta-data, about files and folders, such as size, file ownership, access mode (read, write, execute permissions), time and date of creation and modification, file type, or the like. In at least one of the various embodiments, inode data structures may contain one or more references or pointer to the actual data blocks of the contents stored in the file. In at least one of the various embodiments, inodes may be in a known location in a file system. From an inode, a reader or writer may access the contents of the inode and the contents of the file. Some file systems implement inodes using a data structure called an inode. In at least one of the various embodiments, a data structure explicitly named "inode" may be absent, but file systems may have data structures that store data similar to inodes and may provide capabilities similar to inodes as described herein. Also, in at least one of the various embodiments, the inode data may be referred to as stat data, in reference to the stat system call that provides the data to processes.

The terms "snapshot," or "snapshots" as used herein refer to a data structure that maintains a stable image in a well-defined state for one or more files system objects in a file system. Snapshots preserve point-in-time consistent state and/or contents of one or more file system objects. Snapshots may enable the state and/or contents of file system object to be preserved based on the point-in-time the snapshot was generated. In at least one of the various embodiments, snapshots may be generated on demand or automatically (e.g., event driven and/or timer driven).

In at least one of the various embodiments, if a data block in a file is about to be modified it may be copied from the file to the snapshot to preserve the block. Data blocks in a file that remain unmodified may be absent from the snapshot data structure. Thus, in at least one of the various embodiments, a snapshot may be a sparse copy of the file contents with unmodified data blocks remaining in the file rather than being copied to the snapshot.

The term "file system object," as used herein refers to the various objects that may be included and/or stored in a file system, such as files, inodes, directories, symbolic links, hard links, or the like.

The term "synchronized snapshot," as used herein refers to snapshot that is guaranteed to the synchronized between two or more file system clusters. In at least one of the various embodiments, the file system objects content/state is guaranteed to be consistent across file system clusters corresponding to the synchronized snapshot. Thus, if file system cluster are restored to the same synchronized snapshot, the file system objects will be logically the same on each file system cluster.

The term "LIN," as used herein refers to a logical inode that may be used to identify and reference file system objects in a file system.

The term "failover" as used herein refers to a process may be employed to bring a secondary file system cluster online and active if a primary file system cluster becomes unavailable.

The term "failback" as used herein refers to a process may be employed to bring a primary file system cluster back online after it becomes available after failover.

The term "version," or "file system cluster version" as used herein refers to the state/contents of a file system at a point-in-time. In at least one of the various embodiments, the head version may correspond to the latest version of the file system. Each snapshot of a file system may be considered to correspond to a version of the file system. However, versions may exist absent a corresponding snapshot (e.g., head version).

Briefly stated, various embodiments are directed towards replication and restoration of file system objects stored on file system clusters. In at least one of the various embodiments, snapshots may be employed to establish point-in-time versions of the file system cluster. Modified file system objects may be tracked using a snapshot tracking file corresponding to a snapshot. In at least one of the various embodiments, the snapshot tracking file may be employed to generate a snapshot change set that includes the changes made to file system objects subsequent to the generation of the snapshot.

In at least one of the various embodiments, a snapshot change set may be used to restore a file system cluster to the version corresponding to the snapshot by reversing the changes included in the snapshot change set. Also, in at least one of the various embodiments, the snapshot change set may be used to replicate file system objects from a primary file system cluster by committing the included changes on a secondary file system cluster.

In at least one of the various embodiments, a primary file system cluster may commit snapshot change sets onto a secondary file system cluster. If the primary file system cluster becomes unavailable the file system may failover to the secondary file system cluster. In at least one of the various embodiments, the secondary file system cluster may be restored to a consistent data point by restoring to a synchronized snapshot. In at least one of the various embodiments, if the primary file system cluster becomes available it may be restored by committing changes included in one or more snapshot change sets generated on the secondary file system cluster.

Illustrative Operating Environment

FIG. 1 shows components of an environment in which various embodiments may be practiced. Not all of the components may be required to practice the various embodiments, and variations in the arrangement and type of the components may be made without departing from the spirit or scope of the various embodiments.

In at least one embodiment, cloud network 102 enables one or more network services for a user based on the operation of corresponding arrangements 104 and 106 of virtually any type of networked computing device. As shown, the networked computing devices may include server network device 112, host network device 114, enclosure of blade servers 110, enclosure of server computers 116, super computer network device 118, and the like. Although not shown, one or more mobile devices may be included in cloud network 102 in one or more arrangements to provide one or more network services to a user. Also, these arrangements of networked computing devices may or may not be mutually exclusive of each other.

Additionally, the user may employ a plurality of virtually any type of wired or wireless networked computing devices to communicate with cloud network 102 and access at least one of the network services enabled by one or more of arrangements 104 and 106. These networked computing devices may include tablet mobile device 122, handheld mobile device 124, wearable mobile device 126, desktop network device 120, and the like. Although not shown, in various embodiments, the user may also employ notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), televisions, integrated devices combining at least one of the preceding devices, and the like.

One embodiment of a mobile device is described in more detail below in conjunction with FIG. 3. Generally, mobile devices may include virtually any substantially portable networked computing device capable of communicating over a wired, wireless, or some combination of wired and wireless network.

In various embodiments, network 102 may employ virtually any form of communication technology and topology. For example, network 102 can include local area networks Personal Area Networks (PANs), (LANs), Campus Area Networks (CANs), Metropolitan Area Networks (MANs) Wide Area Networks (WANs), direct communication connections, and the like, or any combination thereof. On an interconnected set of LANs, including those based on differing architectures and protocols, a router acts as a link between LANs, enabling messages to be sent from one to another. In addition, communication links within networks may include virtually any type of link, e.g., twisted wire pair lines, optical fibers, open air lasers or coaxial cable, plain old telephone service (POTS), wave guides, acoustic, full or fractional dedicated digital communication lines including T1, T2, T3, and T4, and/or other carrier and other wired media and wireless media. These carrier mechanisms may include E-carriers, Integrated Services Digital Networks (ISDNs), universal serial bus (USB) ports, Firewire ports, Thunderbolt ports, Digital Subscriber Lines (DSLs), wireless links including satellite links, or other communications links known to those skilled in the art. Moreover, these communication links may further employ any of a variety of digital signaling technologies, including without limit, for example, DS-0, DS-1, DS-2, DS-3, DS-4, OC-3, OC-12, OC-48, or the like. Furthermore, remotely located computing devices could be remotely connected to networks via a modem and a temporary communication link. In essence, network 102 may include virtually any communication technology by which information may travel between computing devices. Additionally, in the various embodiments, the communicated information may include virtually any kind of information including, but not limited to processor-readable instructions, data structures, program modules, applications, raw data, control data, archived data, video data, voice data, image data, text data, and the like.

Network 102 may be partially or entirely embodied by one or more wireless networks. A wireless network may include any of a variety of wireless sub-networks that may further overlay stand-alone ad-hoc networks, and the like. Such sub-networks may include mesh networks, Wireless LAN (WLAN) networks, Wireless Router (WR) mesh, cellular networks, pico networks, PANs, Open Air Laser networks, Microwave networks, and the like. Network 102 may further include an autonomous system of intermediate network devices such as terminals, gateways, routers, switches, firewalls, load balancers, and the like, which are coupled to wired and/or wireless communication links. These autonomous devices may be operable to move freely and randomly and organize themselves arbitrarily, such that the topology of network 102 may change rapidly.

Network 102 may further employ a plurality of wired and wireless access technologies, e.g., 2nd (2G), 3rd (3G), 4th (4G), $5^{th}$ (5G) generation wireless access technologies, and the like, for mobile devices. These wired and wireless access technologies may also include Global System for Mobile communication (GSM), General Packet Radio Services (GPRS), Enhanced Data GSM Environment (EDGE), Code Division Multiple Access (CDMA), Wideband Code Division Multiple Access (WCDMA), Long Term Evolution Advanced (LTE), Universal Mobile Telecommunications System (UMTS), Orthogonal frequency-division multiplexing (OFDM), Wideband Code Division Multiple Access (W-CDMA), Code Division Multiple Access 2000 (CDMA2000), Evolution-Data Optimized (EV-DO), High-Speed Downlink Packet Access (HSDPA), IEEE 802.16 Worldwide Interoperability for Microwave Access (WiMax), ultra wide band (UWB), user datagram protocol (UDP), transmission control protocol/Internet protocol (TCP/IP), any portion of the Open Systems Interconnection (OSI) model protocols, Short Message Service (SMS), Multimedia Messaging Service (MMS), Web Access Protocol (WAP), Session Initiation Protocol/Real-time Transport Protocol (SIP/RTP), or any of a variety of other wireless or wired communication protocols. In one non-limiting example, network 102 may enable a mobile device to wirelessly access a network service through a combination of several radio network access technologies such as GSM, EDGE, SMS, HSDPA, LTE and the like.

Enclosure of Blade Servers

Figure 2A:
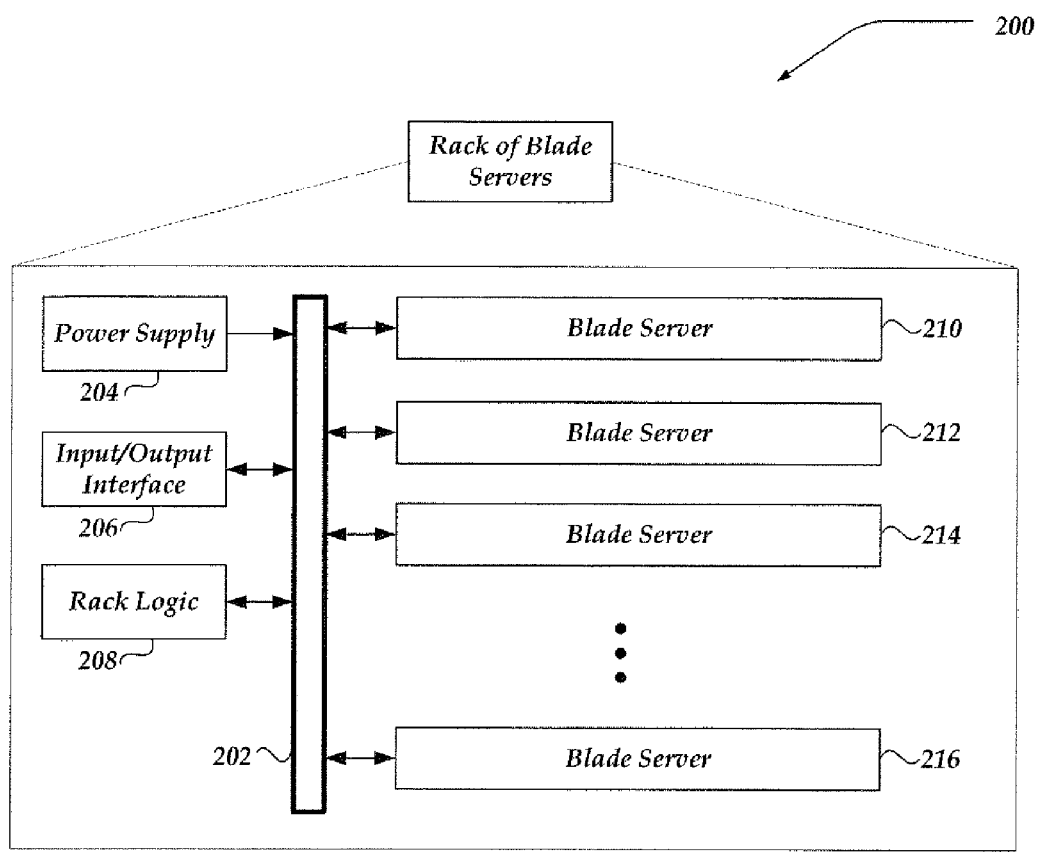
FIG. 2A shows a schematic drawing of a rack of blade servers.

FIG. 2A shows one embodiment of an enclosure of blade servers 200, which are also illustrated in FIG. 1. Enclosure of blade servers 200 may include many more or fewer components than those shown in FIG. 2A. However, the components shown are sufficient to disclose an illustrative embodiment. Generally, a blade server is a stripped down server computing device with a modular design optimized to minimize the use of physical space and energy. A blade enclosure can include several blade servers and provide each with power, cooling, network interfaces, input/output interfaces, and resource management. Although not shown, an enclosure of server computers typically includes several computers that merely require a network connection and a power cord connection to operate. Each server computer often includes redundant components for power and interfaces.

As shown in the figure, enclosure 200 contains power supply 204, and input/output interface 206, rack logic 208, several blade servers 210, 212, 214, and 216, and backplane 202. Power supply 204 provides power to each component and blade server within the enclosure. The input/output interface 206 provides internal and external communication for components and blade servers within the enclosure. Backplane 208 can enable passive and active communication of power, logic, input signals, and output signals for each blade server.

Illustrative Blade Server

Figure 2B:
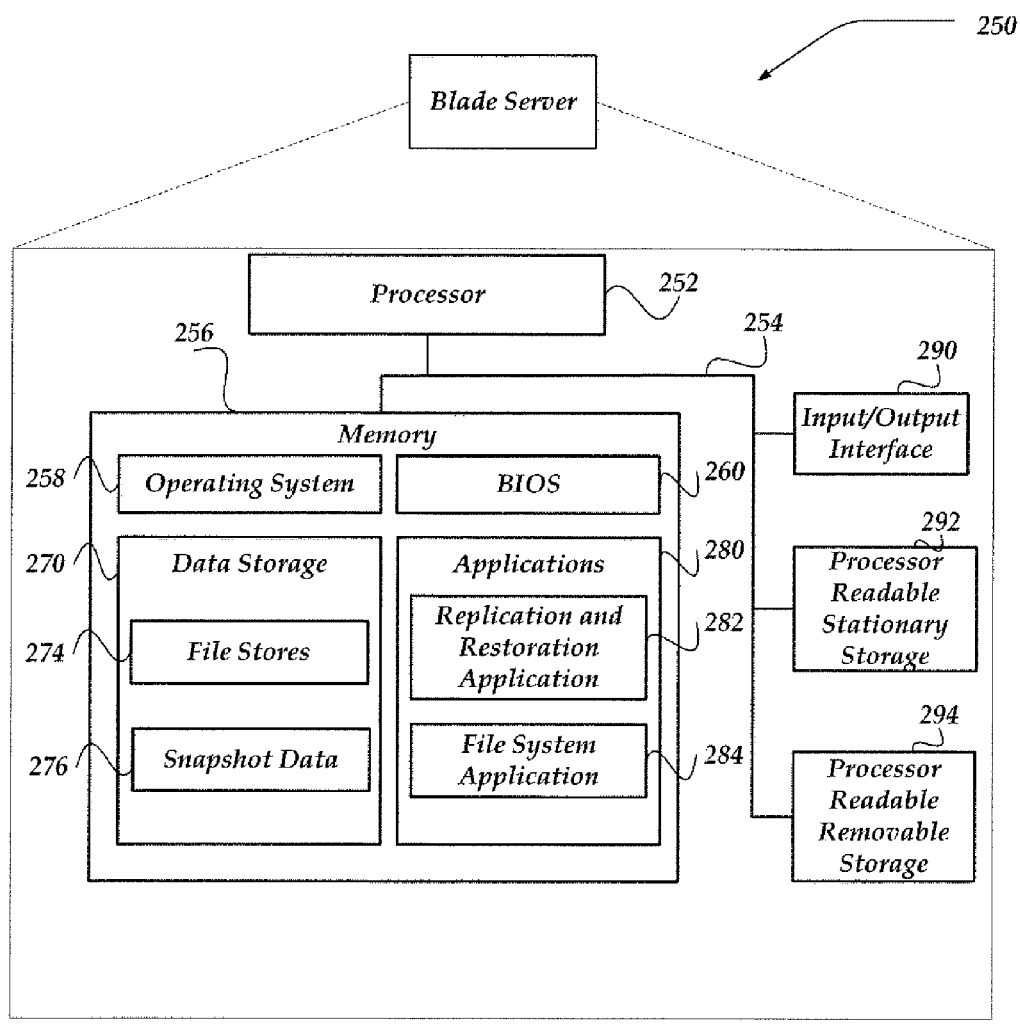
FIG. 2B illustrates a schematic embodiment of a blade server that may be included in a rack of blade servers such as that shown in FIG. 2A.

FIG. 2B illustrates an illustrative embodiment of blade server 250, which may include many more or fewer components than those shown. As shown in FIG. 2A, a plurality of blade servers may be included in one enclosure that shares resources provided by the enclosure to reduce size, power, and cost.

Blade server 250 includes processor 252 which communicates with memory 256 via bus 254. Blade server 250 also includes input/output interface 290, processor-readable stationary storage device 292, and processor-readable removable storage device 294. Input/output interface 290 can enable blade server 250 to communicate with other blade servers, mobile devices, network devices, and the like. Interface 190 may provide wireless and/or wired communication links for blade server. Processor-readable stationary storage device 292 may include one or more devices such as an electromagnetic storage device (hard disk), solid state hard disk (SSD), hybrid of both an SSD and a hard disk, and the like. In some configurations, a blade server may include multiple storage devices. Also, processor-readable removable storage device 294 enables processor 252 to read non-transitive storage media for storing and accessing processor-readable instructions, modules, data structures, and other forms of data. The non-transitive storage media may include Flash drives, tape media, floppy media, and the like.

Memory 256 may include Random Access Memory (RAM), Read-Only Memory (ROM), hybrid of RAM and ROM, and the like. As shown, memory 256 includes operating system 258 and basic input/output system (BIOS) 260 for enabling the operation of blade server 250. In various embodiments, a general-purpose operating system may be employed such as a version of UNIX, LINUX™, a specialized server operating system such as Microsoft's Windows Server™ and Apple Computer's IoS Server™, or the like.

Memory 256 further includes one or more data storage 270, which can be utilized by blade server 250 to store, among other things, applications 280 and/or other data. Data stores 270 may include program code, data, algorithms, and the like, for use by processor 252 to execute and perform actions. In one embodiment, at least some of data store 270 might also be stored on another component of blade server 250, including, but not limited to, processor-readable removable storage device 294, processor-readable stationary storage device 292, or any other processor-readable storage device (not shown). Data storage 270 may include, for example, file stores 274, and snapshot data 276.

Applications 280 may include processor executable instructions which, when executed by blade server 250, transmit, receive, and/or otherwise process messages, audio, video, and enable communication with other networked computing devices. Examples of application programs include database servers, file servers, calendars, transcoders, and so forth. Applications 280 may include, for example, replication and restoration application 282, and file system application 284.

Human interface components (not pictured), may be remotely associated with blade server 250, which can enable remote input to and/or output from blade server 250. For example, information to a display or from a keyboard can be routed through the input/output interface 290 to appropriate peripheral human interface components that are remotely located. Examples of peripheral human interface components include, but are not limited to, an audio interface, a display, keypad, pointing device, touch interface, and the like.

Illustrative Mobile Device

Figure 3:
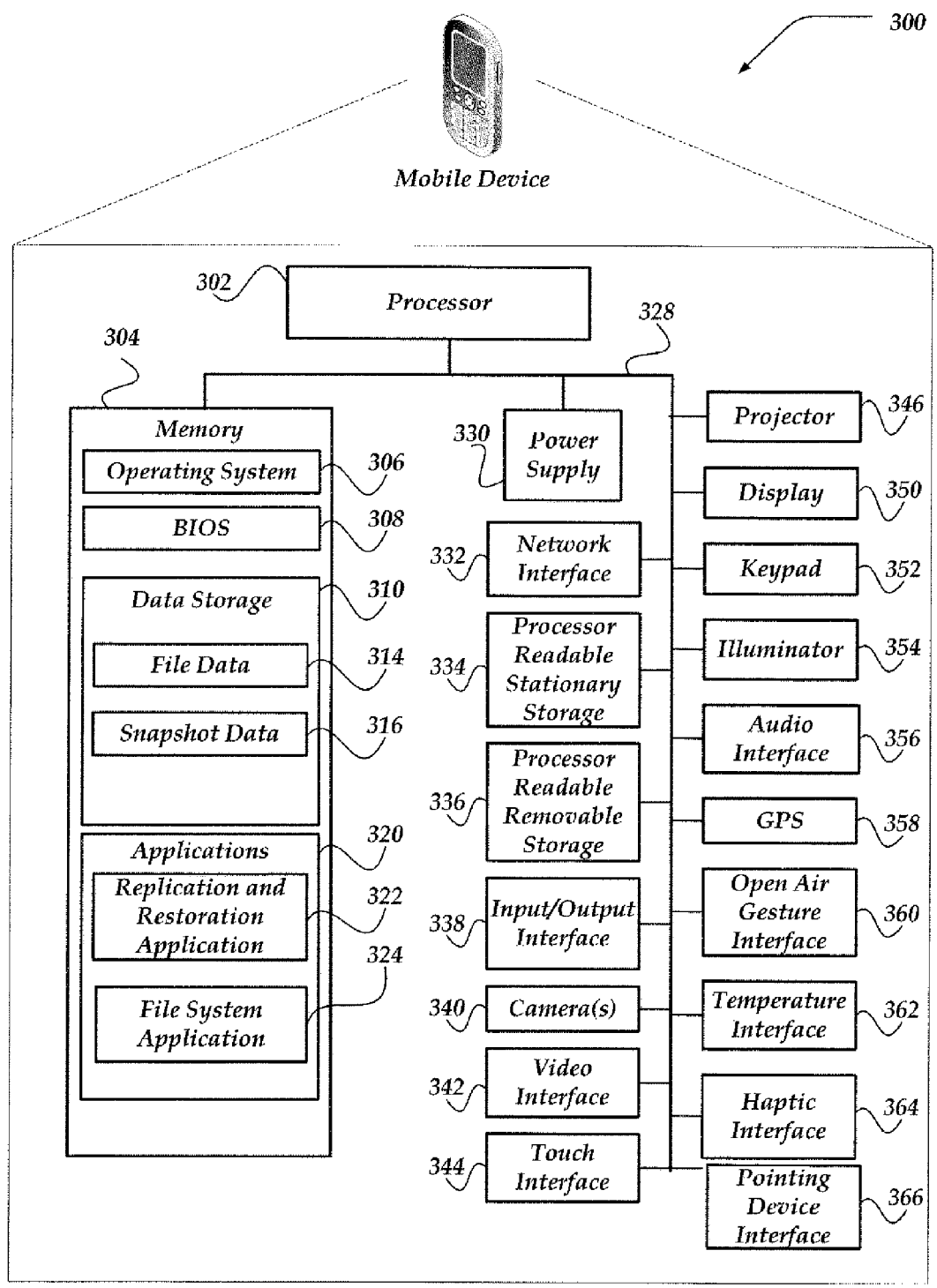
FIG. 3 shows a schematic embodiment of a mobile device.

FIG. 3 shows one embodiment of mobile device 300 that may include many more or less components than those shown. Mobile device 300 may represent, for example, at least one embodiment of mobile devices shown in FIG. 1.

Mobile device 300 includes processor 302 in communication with memory 304 via bus 328. Mobile device 300 also includes power supply 330, network interface 332, audio interface 356, display 350, keypad 352, illuminator 354, video interface 342, input/output interface 338, haptic interface 364, global positioning systems (GPS) receiver 358, Open air gesture interface 360, temperature interface 362, camera(s) 340, projector 346, pointing device interface 366, processor-readable stationary storage device 334, and processor-readable removable storage device 336. Power supply 330 provides power to mobile device 300. A rechargeable or non-rechargeable battery may be used to provide power. The power may also be provided by an external power source, such as an AC adapter or a powered docking cradle that supplements and/or recharges the battery. And in one embodiment, although not shown, a gyroscope may be employed within mobile device 300 to measuring and/or maintaining an orientation of mobile device 300.

Mobile device 300 may optionally communicate with a base station (not shown), or directly with another computing device. Network interface 332 includes circuitry for coupling mobile device 300 to one or more networks, and is constructed for use with one or more communication protocols and technologies including, but not limited to, protocols and technologies that implement any portion of the Open Systems Interconnection (OSI) model for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), Web Access Protocol (WAP), ultra wide band (UWB), IEEE 802.16 Worldwide Interoperability for Microwave Access (WiMax), Session Initiation Protocol/Real-time Transport Protocol (SIP/RTP), General Packet Radio Services (GPRS), Enhanced Data GSM Environment (EDGE), Wideband Code Division Multiple Access (WCDMA), Long Term Evolution Advanced (LTE), Universal Mobile Telecommunications System (UMTS), Orthogonal frequency-division multiplexing (OFDM), Code Division Multiple Access 2000 (CDMA2000), Evolution-Data Optimized (EV-DO), High-Speed Downlink Packet Access (HSDPA), or any of a variety of other wireless communication protocols. Network interface 332 is sometimes known as a transceiver, transceiving device, or network interface card (NIC).

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of mobile device 300, e.g., using voice recognition, detecting touch based on sound, and the like.

Display 350 may be a liquid crystal display (LCD), gas plasma, electronic ink, light emitting diode (LED), Organic LED (OLED) or any other type of light reflective or light transmissive display that can be used with a computing device. Display 350 may also include a touch interface 344 arranged to receive input from an object such as a stylus or a digit from a human hand, and may use resistive, capacitive, surface acoustic wave (SAW), infrared, radar, or other technologies to sense touch and/or gestures. Projector 346 may be a remote handheld projector or an integrated projector that is capable of projecting an image on a remote wall or any other reflective object such as a remote screen.

Video interface 342 may be arranged to capture video images, such as a still photo, a video segment, an infrared video, or the like. For example, video interface 342 may be coupled to a digital video camera, a web-camera, or the like. Video interface 342 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 352 may comprise any input device arranged to receive input from a user. For example, keypad 352 may include a push button numeric dial, or a keyboard. Keypad 352 may also include command buttons that are associated with selecting and sending images. Illuminator 354 may provide a status indication and/or provide light. Illuminator 354 may remain active for specific periods of time or in response to events. For example, when illuminator 354 is active, it may backlight the buttons on keypad 352 and stay on while the mobile device is powered. Also, illuminator 354 may backlight these buttons in various patterns when particular actions are performed, such as dialing another mobile device. Illuminator 354 may also cause light sources positioned within a transparent or translucent case of the mobile device to illuminate in response to actions.

Mobile device 300 also comprises input/output interface 338 for communicating with external peripheral devices or other computing devices such as other mobile devices and network devices. The peripheral devices may include an audio headset, display screen glasses, remote speaker system, remote speaker and microphone system, and the like. Input/output interface 338 can utilize one or more technologies, such as Universal Serial Bus (USB), Infrared, WiFi, WiMax, Bluetooth™, and the like. Haptic interface 364 is arranged to provide tactile feedback to a user of the mobile device. For example, the haptic interface 364 may be employed to vibrate mobile device 300 in a particular way when another user of a computing device is calling. Temperature interface 362 may be used to provide a temperature measurement input and/or a temperature changing output to a user of mobile device 300. Open air gesture interface 360 may sense physical gestures of a user of mobile device 300, for example, by using single or stereo video cameras, radar, a gyroscopic sensor inside a device held or worn by the user, or the like. Camera 340 may be used to track physical eye movements of a user of mobile device 300.

GPS transceiver 358 can determine the physical coordinates of mobile device 300 on the surface of the Earth, which typically outputs a location as latitude and longitude values. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAD, Enhanced Timing Advance (ETA), Base Station Subsystem (BSS), or the like, to further determine the physical location of mobile device 300 on the surface of the Earth. It is understood that under different conditions, GPS transceiver 358 can determine a physical location for mobile device 300. In at least one embodiment, however, mobile device 300 may, through other components, provide other information that may be employed to determine a physical location of the device, including for example, a Media Access Control (MAC) address, IP address, and the like.

Human interface components can be peripheral devices that are physically separate from mobile device 300, allowing for remote input and/or output to mobile device 300. For example, information routed as described here through human interface components such as display 350 or keyboard 352 can instead be routed through network interface 332 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a mobile device with such peripheral human interface components is a wearable computing device, which might include a remote pico projector along with one or more cameras that remotely communicate with a separately located mobile device to sense a user's gestures toward portions of an image projected by the pico projector onto a reflected surface such as a wall or the user's hand.

A mobile device may include a browser application that is configured to receive and to send web pages, web-based messages, graphics, text, multimedia, and the like. The mobile device's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of mobile device 300. The memory also stores an operating system 306 for controlling the operation of mobile device 300. It will be appreciated that this component may include a general-purpose operating system such as a version of UNIX, or LINUX™, or a specialized mobile computer communication operating system such as Windows Mobile™, or the Symbian® operating system. The operating system may include, or interface with a Java virtual machine module that enables control of hardware components and/or operating system operations via Java application programs.

Memory 304 further includes one or more data storage 310, which can be utilized by mobile device 300 to store, among other things, applications 320 and/or other data. For example, data storage 310 may also be employed to store information that describes various capabilities of mobile device 300. The information may then be provided to another device based on any of a variety of events, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions. In one embodiment, at least some of data storage 310 might also be stored on another component of mobile device 300, including, but not limited to, non-transitory processor-readable removable storage device 336, processor-readable stationary storage device 334, or even external to the mobile device. Data storage 310 may include, for example, file data 314, snapshot data 316, or the like.

Applications 320 may include computer executable instructions which, when executed by mobile device 300, transmit, receive, and/or otherwise process instructions and data. Applications 320 may include, for example, replication and restoration application 322, and file system application 324. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Illustrative Network Device

Figure 4:
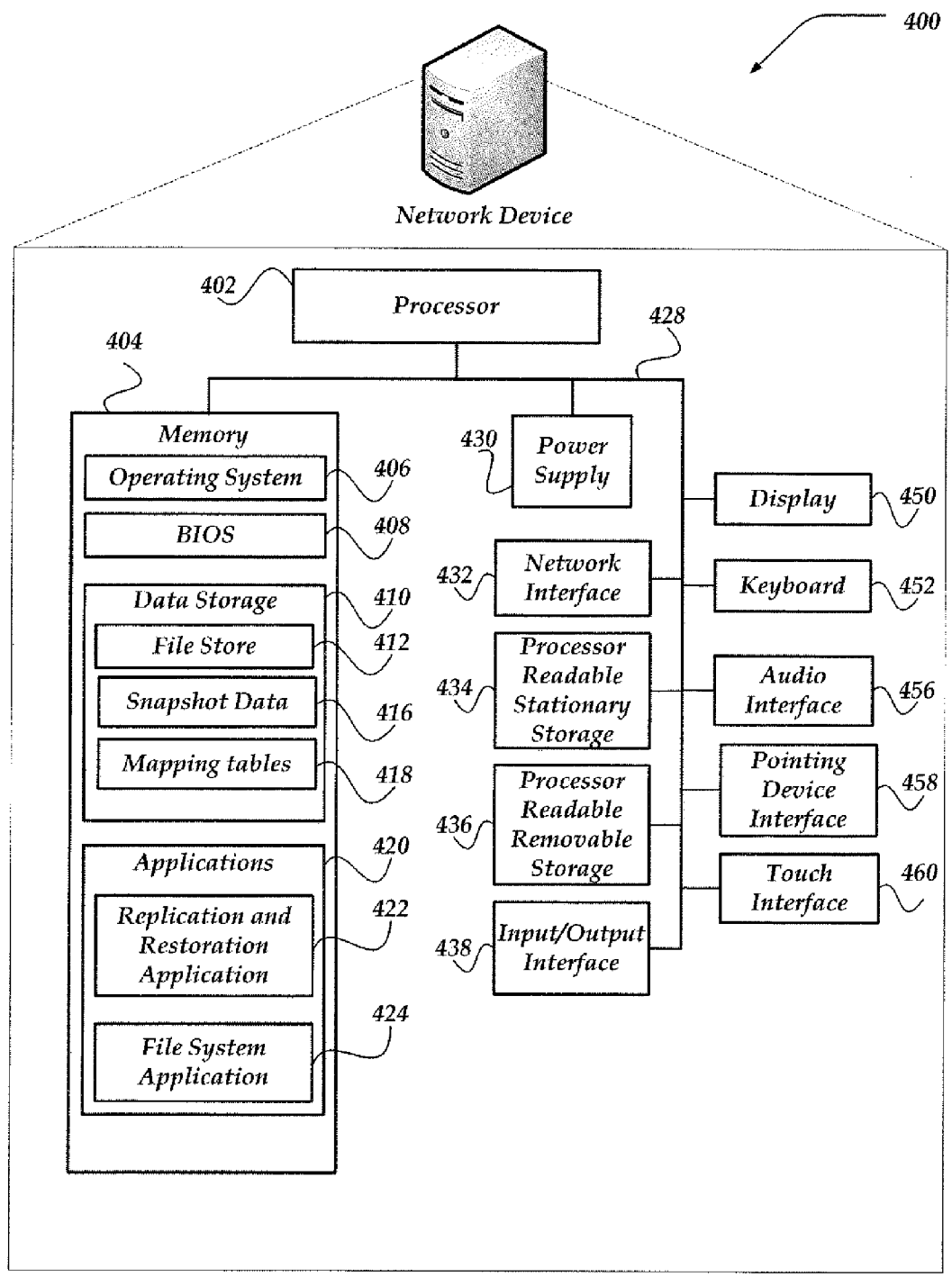
FIG. 4 illustrates a schematic embodiment of a network device.

FIG. 4 shows one embodiment of network device 400 that may be included in a system implementing the invention. Network device 400 may include many more or less components than those shown in FIG. 4. However, the components shown are sufficient to disclose an illustrative embodiment for practicing the present invention. Network device 400 may represent, for example, one embodiment of at least one of network device 112, 114, or 120 of FIG. 1.

As shown in the figure, network device 400 includes a processor 402 in communication with a memory 404 via a bus 428. Network device 400 also includes a power supply 430, network interface 432, audio interface 456, display 450, keyboard 452, input/output interface 438, processor-readable stationary storage device 434, and processor-readable removable storage device 436. Power supply 430 provides power to network device 400.

Network interface 432 includes circuitry for coupling network device 400 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 432 is sometimes known as a transceiver, transceiving device, or network interface card (NIC). Network device 400 may optionally communicate with a base station (not shown), or directly with another computing device.

Audio interface 456 is arranged to produce and receive audio signals such as the sound of a human voice. For example, audio interface 456 may be coupled to a speaker and microphone (not shown) to enable telecommunication with others and/or generate an audio acknowledgement for some action. A microphone in audio interface 456 can also be used for input to or control of network device 400, for example, using voice recognition.

Display 450 may be a liquid crystal display (LCD), gas plasma, electronic ink, light emitting diode (LED), Organic LED (OLED) or any other type of light reflective or light transmissive display that can be used with a computing device. Display 450 may be a handheld projector or pico projector capable of projecting an image on a wall or other object.

Network device 400 also may also comprise input/output interface 438 for communicating with external devices not shown in FIG. 4. Input/output interface 438 can utilize one or more wired or wireless communication technologies, such as USB™, Firewire™, WiFi, WiMax, Thunderbolt™, Infrared, Bluetooth™, Zigbee™, serial port, parallel port, and the like.

Human interface components can be physically separate from network device 400, allowing for remote input and/or output to network device 400. For example, information routed as described here through human interface components such as display 450 or keyboard 452 can instead be routed through the network interface 432 to appropriate human interface components located elsewhere on the network. Human interface components include any component that allows the computer to take input from, or send output to, a human user of a computer.

Memory 404 may include Random Access Memory (RAM), Read-Only Memory (ROM), and/or other types of memory. Memory 404 illustrates an example of computer-readable storage media (devices) for storage of information such as computer-readable instructions, data structures, program modules or other data. Memory 404 stores a basic input/output system (BIOS) 408 for controlling low-level operation of network device 400. The memory also stores an operating system 406 for controlling the operation of network device 400. It will be appreciated that this component may include a general-purpose operating system such as a version of UNIX, or LINUX™, or a specialized operating system such as Microsoft Corporation's Windows® operating system, or the Apple Corporation's IOs® operating system. The operating system may include, or interface with a Java virtual machine module that enables control of hardware components and/or operating system operations via Java application programs.

Memory 404 further includes one or more data storage 410, which can be utilized by network device 400 to store, among other things, applications 420 and/or other data. For example, data storage 410 may also be employed to store information that describes various capabilities of network device 400. The information may then be provided to another device based on any of a variety of events, including being sent as part of a header during a communication, sent upon request, or the like. Data storage 410 may also be employed to store social networking information including address books, buddy lists, aliases, user profile information, or the like. Data stores 410 may further include program code, data, algorithms, and the like, for use by a processor, such as processor 402 to execute and perform actions. In one embodiment, at least some of data store 410 might also be stored on another component of network device 400, including, but not limited to, non-transitory media inside processor-readable removable storage device 436, processor-readable stationary storage device 434, or any other computer-readable storage device within network device 400, or even external to network device 400. Data storage 410 may include, for example, file store 412, snapshot data 416, and mapping tables 418.

Applications 420 may include computer executable instructions which, when executed by network device 400, transmit, receive, and/or otherwise process messages (e.g., SMS, Multimedia Messaging Service (MMS), Instant Message (IM), email, and/or other messages), audio, video, and enable telecommunication with another user of another mobile device. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 420 may include, for example, replication and restoration application 422, and file system application 424.

Illustrative Logical Operations

In at least one of the various embodiments, a primary file system cluster may be arranged with another secondary file system cluster providing backup and/or redundancy for the primary file system cluster. Thus, if the primary file system cluster should become unavailable the secondary file system cluster may take over its responsibilities.

In at least one of the various embodiments, a secondary file system cluster may be arranged to mirror the contents of a primary file system cluster. Accordingly, in at least one of the various embodiments, periodically the contents and/or state of the primary file system cluster may be transferred and committed to the secondary file system cluster.

In at least one of the various embodiments, if a primary file system cluster fails or becomes unavailable while the mirroring process is active, there is a probability that the file system content/state on the secondary file system cluster to be inconsistent. Accordingly, effective mirroring/backup procedures may include protocols that may be sufficient to retain file system consistency in the face of failure during the mirroring process.

In at least one of the various embodiments, replication and restoration application (RRA) 422 may be enabled to commit changes from the primary file system cluster to the secondary file system cluster using a transaction based protocol. Such a protocol may enable the file system application to receive insurances from RRA 422 that up to the point-in-time of the last backup transaction, data on the secondary file system cluster may be consistent.

Figure 5:
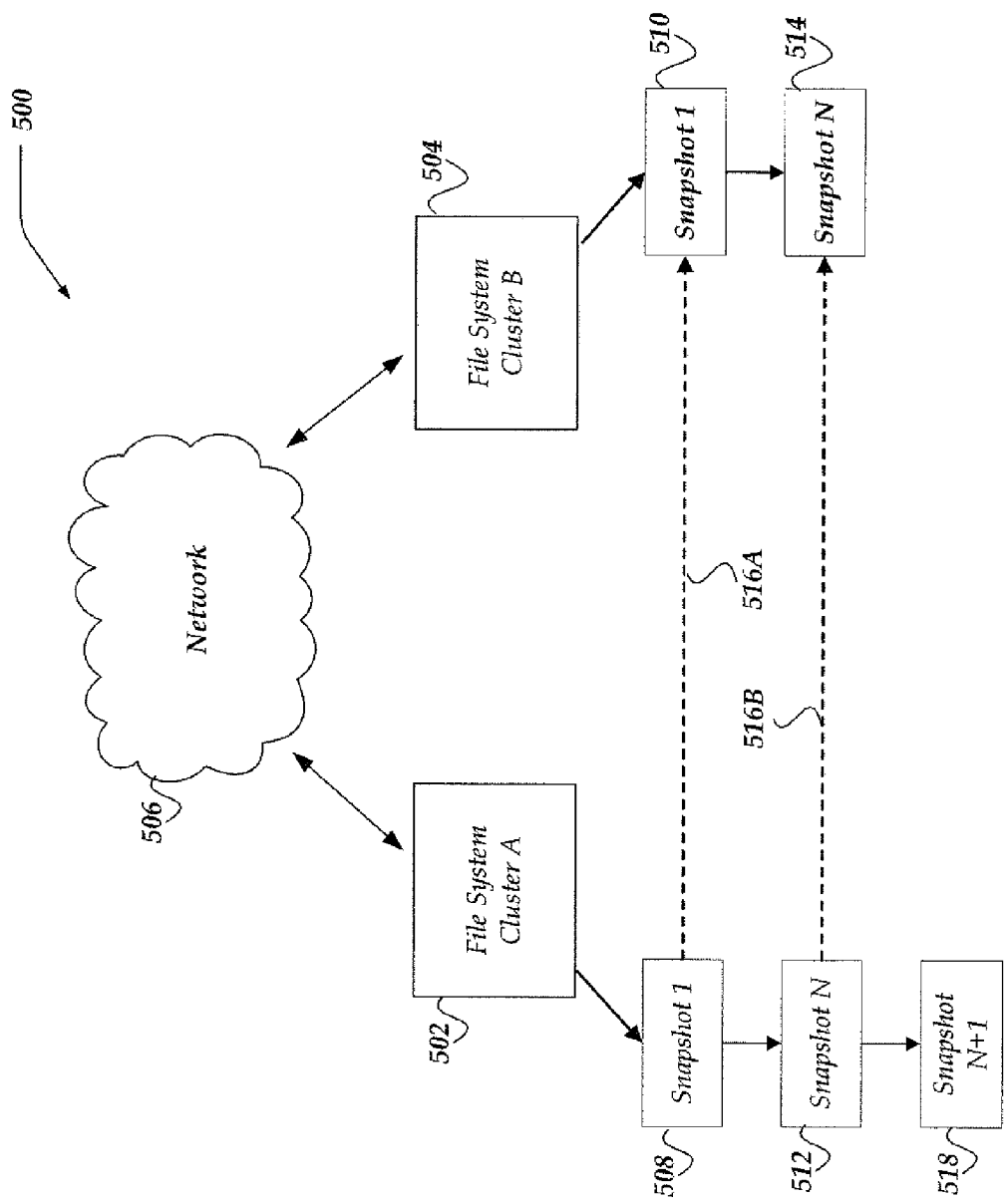
FIG. 5 illustrates an overview of file cluster mirroring in accordance with at least one of the various embodiments.

FIG. 5 illustrates an overview of file system cluster backup/mirroring in accordance with at least one of the various embodiments. In at least one of the various embodiments, primary file system cluster 502 (Cluster A) and secondary file system cluster 504 (Cluster B) may be enabled to communicate over network 506.

In at least one of the various embodiments, file system cluster 504 may be arranged to mirror and/or backup file system cluster 502. Thus, in this example, file system cluster 502 may be the primary file system cluster and file system cluster 504 may be the secondary file system cluster.

In at least one of the various embodiments, RRA 422 may be arranged to mirror primary file system cluster 502 by periodically transferring the changes that may have occurred between two versions of the primary file system cluster. In at least one of the various embodiments, the versions may be demarked by snapshots generated on the primary file system cluster.

In at least one of the various embodiments, snapshot 508 represents a point-in-time state of file system cluster 502. In at least one of the various embodiments, snapshot 508 may be incrementally synchronized to file system cluster 504 as snapshot 510. Likewise, snapshot 512 may be incrementally synchronized resulting in snapshot 514 on file system cluster 504.

In at least one of the various embodiments, incremental synchronization transfers changes from the primary file system cluster to the secondary file system cluster. In at least one of the various embodiments, the synchronization is incremental because it may take several network transactions to complete the process of generating a synchronized snapshot.

In at least one of the various embodiments, incremental synchronization process 516A illustrates committing the changes from file system cluster 502 such that snapshot 510 mirrors snapshot 508. Likewise, in at least one of the various embodiments, incremental synchronization process 516B illustrates committing the changes from file system cluster 502 such that snapshot 512 mirrors snapshot 514. However, the synchronization of snapshot 518 has not completed. Thus, in at least one of the various embodiments, if file system cluster 502 (Cluster A) becomes unavailable RRA 422 may provide consistent data on secondary file system cluster 504 corresponding to snapshot 512. In at least one of the various embodiments, this may be because the incremental synchronization corresponding to snapshot 518 may not have completed before file system cluster 502 became unavailable. Thus, the most recent synchronized snapshot available on file system cluster 504 may be snapshot 514.

FIGS. 6A-6D illustrate an overview of the failover-failback procedure in accordance with at least one of the various embodiments. These figures illustrate for at least one of the various embodiments, the logical operations involved in a failover and a subsequent failback.

Figure 6A:
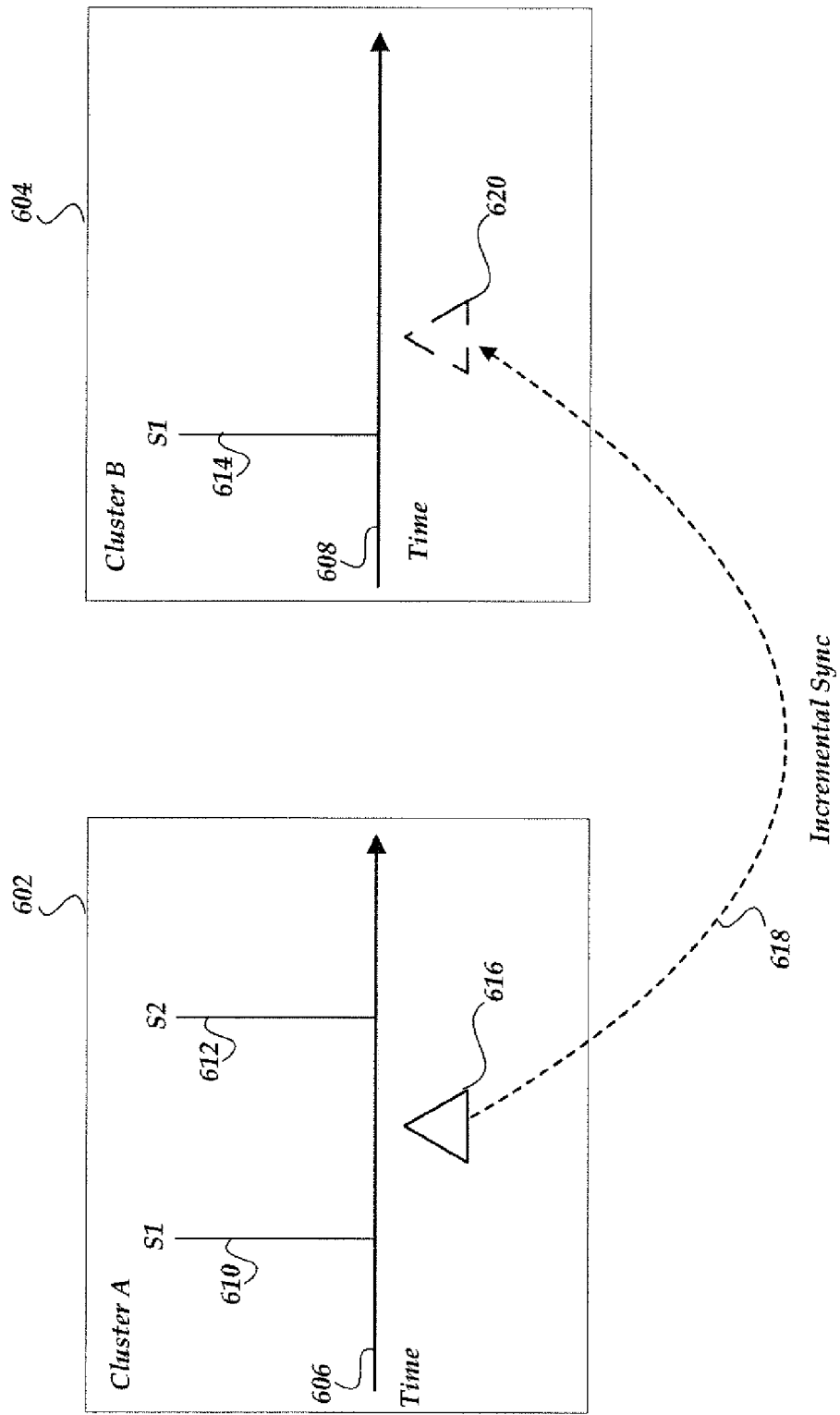
FIGS. 6A-6D illustrate an overview of the failover-failback procedure in accordance with at least one of the various embodiments.

For at least one of the various embodiments, FIG. 6A shows file system cluster 602 and file system cluster 604 arranged such that file system cluster 602 may be a primary file system cluster and file system cluster 604 may be a secondary file system cluster (secondary to file system cluster 602). The axis 606 and 608 represent increasing time as changes may be made to the file system clusters.

In at least one of the various embodiments, primary file system cluster 602 and secondary file system cluster 604 may be synchronized to snapshot S1. Snapshot 610 on primary file system cluster 602 and snapshot 614 on secondary file system cluster 604 may be considered to be synchronized snapshots.

In this example, in at least one of the various embodiments, subsequently snapshot 612 (S2) may be generated on file system cluster 602. In at least one of the various embodiments, RRA 422 may be employed to determine snapshot change set 616 that represents the changes to file system cluster 602 that may have occurred since snapshot 601 (S1) and until snapshot 612 (S2) was generated. Accordingly, in at least one of the various embodiments, incremental synchronization process 618 may be initiated by RRA 422 to commit snapshot change set 616 to file system cluster 604. In at least one of the various embodiments, partial snapshot change set 620 may be generated by RRA 422 as the incremental synchronization process proceeds. In at least one of the various embodiments, if incremental synchronization process 618 runs to completion, file system cluster 604 may generate a snapshot equivalent to snapshot 612.

In at least one of the various embodiments, snapshot change sets may include a plurality of changes that may be incrementally committed on a target file system cluster, such as file system cluster 604. In at least one of the various embodiments, as the changes may be received from the source file system cluster the changes may be executed on the target file system cluster.

Figure 6B:
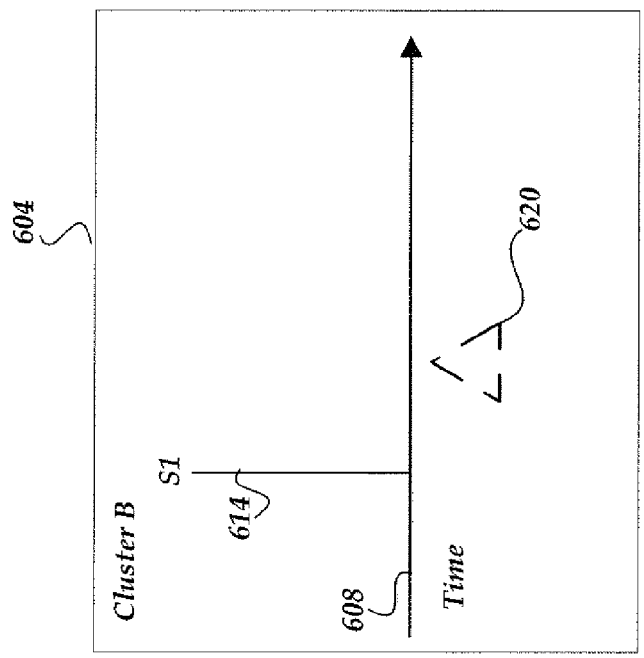
Figure 6B:
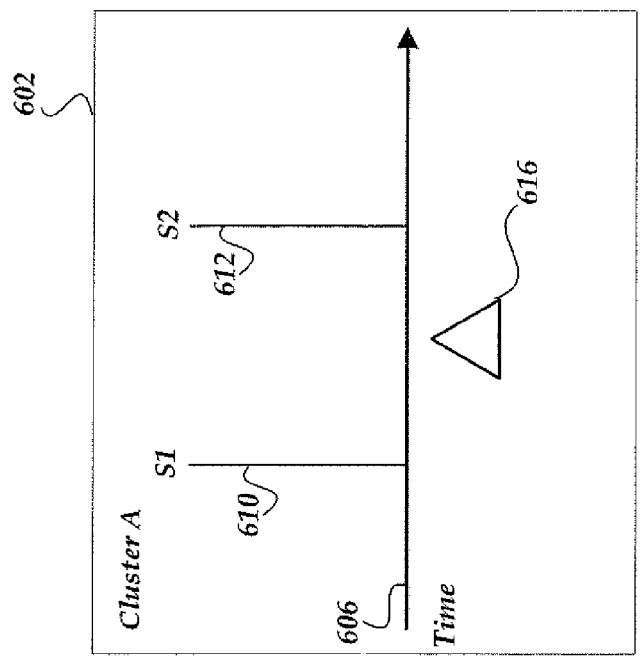

Continuing with this example, FIG. 6B shows for at least one of the various embodiments the incremental synchronization process 616 making an unplanned exit. In at least one of the various embodiments, this may be because file system cluster 602 has unexpectedly become unavailable (e.g., network failure, power loss, or the like). In at least one of the various embodiments, if file system cluster 602 becomes unavailable before the completion of incremental synchronization process 616, file system cluster 604 may have an inconsistent mirror/backup the primary file system cluster's (file system cluster 602) data. The secondary file system cluster, file system cluster 604 may have received and committed just a portion of snapshot change set 616, this partial snapshot change set 620 represents an indeterminate transfer of data and state from snapshot change set 616.

In at least one of the various embodiments, if the primary file system cluster becomes unavailable, the secondary file system cluster may be brought online as the active file cluster. In at least one of the various embodiments, this process may be the failover process, where the distributed file system fails over from the primary file system cluster to the backup secondary file system cluster. Thus, in this example, file system cluster 604 may be activated and brought online to provide file system services while file system cluster 602 may be unavailable.

However, in at least one of the various embodiments, file system cluster 604 may be in an inconstant state, or it may include an inconsistent/indeterminate mirror of the data of file system cluster 602. Thus, before being activated and brought online file system cluster may be restored to a consistent state. In this example, in at least one of the various embodiments, restoring file system cluster 604 to snapshot 614 may return it to the most recent consistent mirror of file system cluster 602. Accordingly, changes corresponding to partial snapshot change set 620 may be undone/reversed. In at least one of the various embodiments, snapshot 614 may be a synchronized snapshot because it may be known to be consistent with snapshot 610 on file system cluster 602.

Figure 6C:
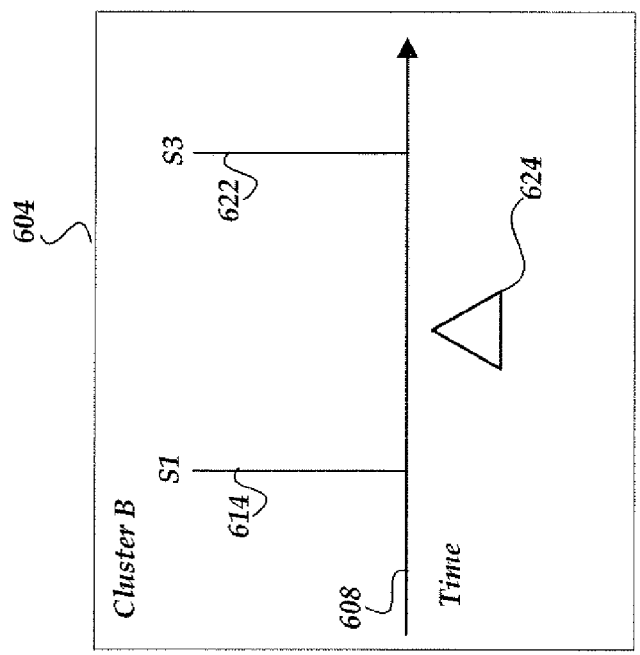
Figure 6C:
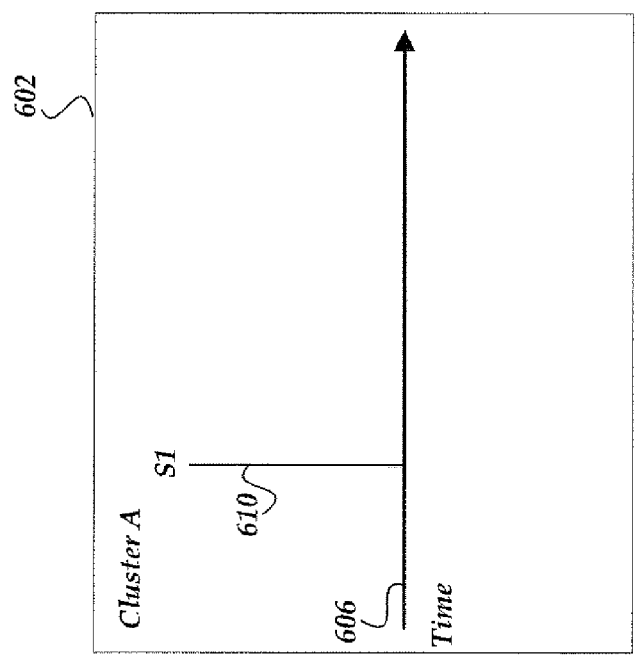

In FIG. 6C, in at least one of the various embodiments, file system cluster 604 may be active and online, providing file system services for users and processes. In at least one of the various embodiments, eventually file system cluster 602 may become available and ready to be restored to the active/primary file system cluster. For example, if the problem that caused file system cluster 602 to become unexpectedly unavailable may be resolved.

In at least one of the various embodiments, a failback procedure must be completed before file system cluster 602 may be brought back online as the primary file system cluster. In at least one of the various embodiments, the failback process may be processed differently than the failover process because it is a controlled process rather than unexpected.

In at least one of the various embodiments, file system cluster 602 may be restored to a point-in-time state that RRA 422 knows is consistent on the secondary file system cluster, file system cluster 604. In this example, S1 is a synchronized snapshot that is consistent on both file system clusters. Accordingly, RRA 422 may restore file system cluster 602 to a state corresponding to snapshot 610. In at least one of the various embodiments, RRA may discard snapshot 612 and snapshot delta 616 (shown in FIG. 6A).

In at least one of the various embodiments, in preparation for restoring file system cluster 602 and bringing it online as the primary file system cluster, the data changes made on file system cluster 604 need to be determined and committed to file system cluster 604.

In at least one of the various embodiments, because the failback process is a controlled process, RRA 422 may obtain a lock on file system cluster 604 that may prevent changes from occurring during the failback process.

In at least one of the various embodiments, RRA 422 may generate snapshot 622 (S3) on file system cluster 604. From snapshot 614 (S1) and snapshot 622 (S3), RRA may determine the snapshot delta 624. In at least one of the various embodiments, snapshot change set 624 includes the data changes, including adds, updates, and deletes, that have occurred in the file system during the time file system cluster 604 was online (acting as the primary file system cluster).

Figure 6D:
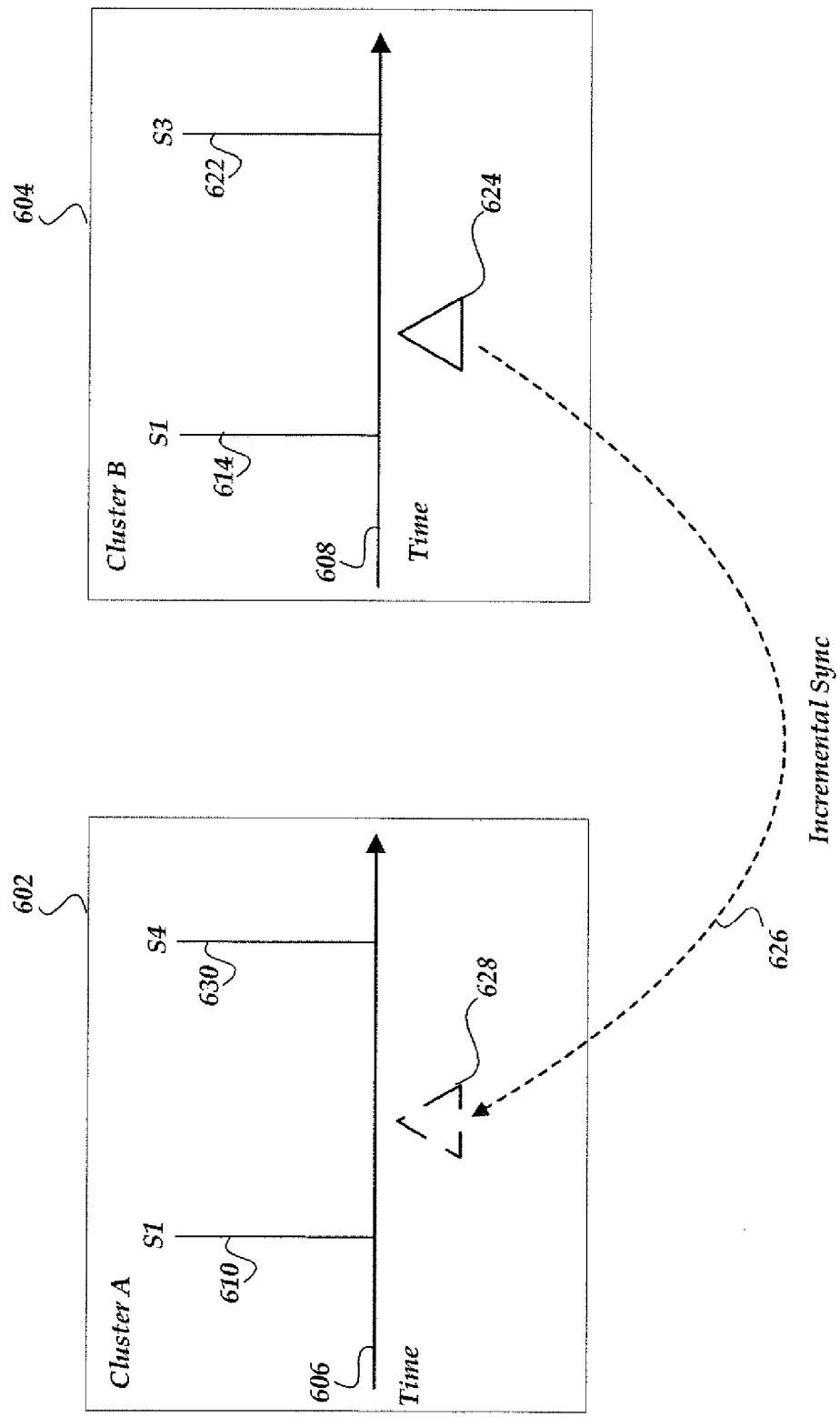

FIG. 6D shows for at least one of the various embodiments, incremental synchronization process 626 committing the changes in snapshot change set 624 on file system cluster 602 (e.g., partial snapshot change set 628). In at least one of the various embodiments, if the incremental synchronization process 626 completes, each change corresponding to snapshot change set 624 is transferred to file system cluster 602 and RRA 422 may generate snapshot 603. Thus, in this example, file system cluster 602 may be in condition to be brought back online and activated as the primary file system cluster. Likewise, file system cluster 604 may be taken offline and returned to being the secondary file system cluster (e.g., receiving backup transactions from mirroring the primary file system cluster).

Snapshot Tracking File and Snapshot Change Set

Figure 7A:
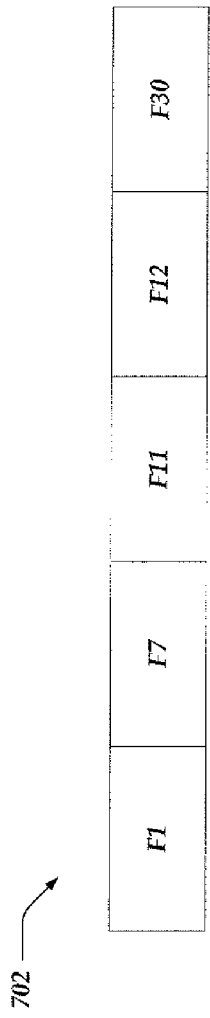
FIGS. 7A-7B illustrate an logical representation of a snapshot tracking file and a snapshot change set in accordance with at least one of the various embodiments.
Figure 7B:
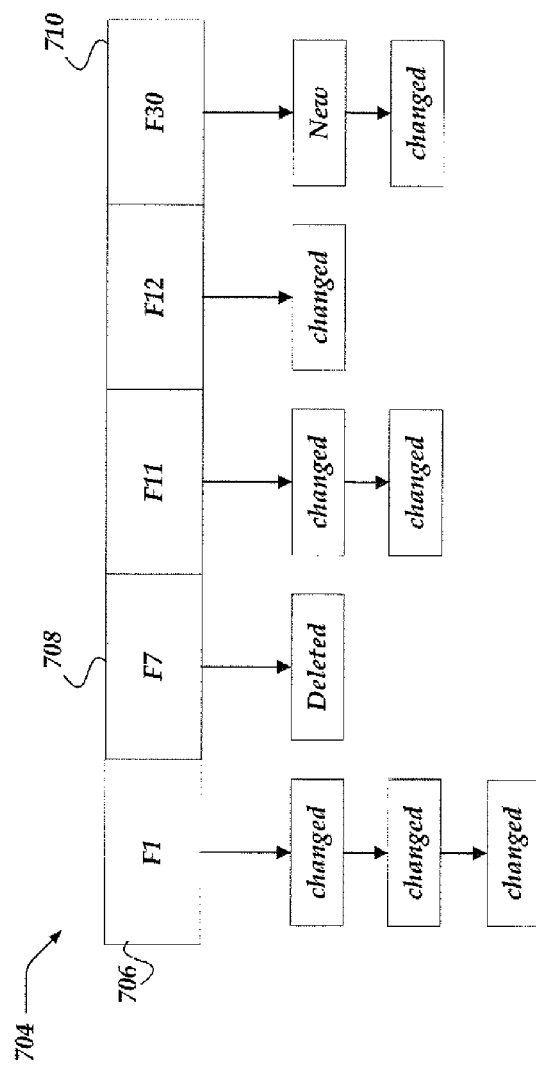

FIGS. 7A-7B illustrate an logical representation of a snapshot tracking file and a snapshot change set in accordance with at least one of the various embodiments.

In at least one of the various embodiments, a snapshot tracking file tracks which file system objects have changed relative to the corresponding snapshot. In at least one of the various embodiments, being listed in a snapshot tracking file indicates that one or more changes have occurred relative to the listed file system object. In at least one of the various embodiments, the particular changes may be absent from the snapshot tracking file.

FIG. 7A shows for at least one of the various embodiments snapshot tracking file 702 that may include tracking information for five file system objects (e.g., F1, F7, F11, F12, and F30). In at least one of the various embodiments, snapshot tracking file 702 may be implemented using well-known data structures such as an array, bitmask, linked list, or the like. In at least one of the various embodiments, the snapshot tracking file may grow as the number of modified file system objects increases.

In at least one of the various embodiments, if RRA 422 may employ a snapshot tracking file to generate a snapshot change set. In at least one of the various embodiments, a snapshot change set may be a data structure that includes the set of changes made to file system objects that have been changed between one or more versions and/or snapshots of a file system cluster.

In at least one of the various embodiments, RRA 422 may enumerate the snapshot tracking file to identify the particular file system object that may be included in a snapshot change set. In at least one of the various embodiments, for each file system object in the snapshot tracking list, RRA 422 may identify the changes that were made to each file system object by reviewing a file system log or by comparing file system data structures, such as, b-trees, in the snapshots and the file system. In at least one of the various embodiments, each determined change and/or modification may be associated with its corresponding file system object in the snapshot change set.

FIG. 7B shows an example of snapshot change set 704 in accordance with at least one of the various embodiments. In this example, snapshot change set 704 includes change element 706 that includes the changes made to file system object "F1". In this example, between the versions compared for snapshot change set 704, three changes (e.g., writes, updates, or moves) have occurred to file system object F1.

Further, in this example, change element 708 represents modifications made to file system object "F7." In this example, F7 was deleted from the file system cluster subsequent to file system version/snapshot that corresponds to the snapshot change set. Likewise, change element 710 represents the modifications that occurred to F30 since the snapshot/version was generated. In this example, F30 was created and subsequent to its creation it was modified.

One of ordinary skill in the art will appreciate that the logical structures of the snapshot tracking file and snapshot change set may be implemented using a variety of well-known data structures, such as, arrays, linked lists, indices, or the like, and the examples used herein are non-limiting and sufficient to disclose at least what is claimed.

Figure 8:
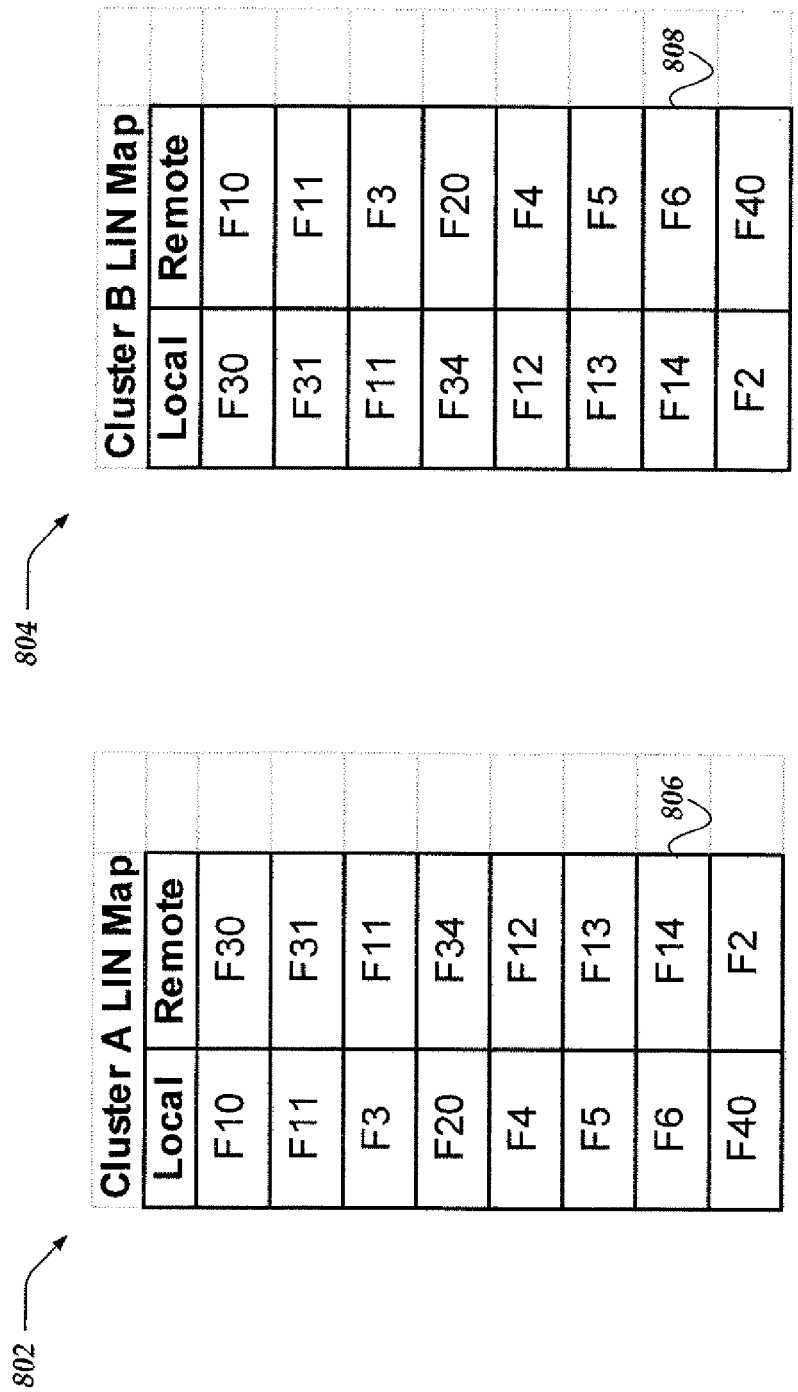
FIG. 8 shows logical representations of cluster logical inode maps in accordance with at least one of the various embodiments.

FIG. 8 shows logical representations of cluster logical inode (LIN) maps in accordance with at least one of the various embodiments. In at least one of the various embodiments, each file system cluster maintains independent LIN values for stored file system objects.

In at least one of the various embodiments, if file system clusters may be arranged into a primary-secondary cluster relationship they may employ LIN maps to map between LIN's that are local LIN and remote LIN in another cluster. Accordingly, in at least one of the various embodiments, primary file system clusters may maintain a LIN Map that may be used to map LINs from the secondary file system clusters to local LINs. Likewise, in at least one of the various embodiments, secondary file system clusters may maintain LIN maps that map between local LIN's and LIN's on the primary file system cluster.

In at least one of the various embodiments, LIN Map 802 may be a logical representation of a map data structure that may be stored on a primary file system cluster. Also, in at least one of the various embodiments, LIN Map 804 may be a logical representation of a LIN map data structure that may be stored on a secondary file system cluster.

In at least one of the various embodiments, the LIN maps may be used to map between LIN included associated with changes in a snapshot change set generated on one file system cluster to LIN values on another file system cluster. In at least one of the various embodiments, each LIN map may be an inverse of each other. In at least one of the various embodiments, by example, row 806 illustrates a mapping between LIN F6 and F14. LIN F6 is the local LIN in the cluster for the item and F14 corresponds to the LIN value of the item on the remote cluster. Likewise, row 808 maps between a local LIN value of F14 and a remote LIN value of F6.

In at least one of the various embodiments, file system objects that were deleted may be regenerated during a restore process. Accordingly, new LIN values may generated for the regenerate file system objects. In at least one of the various embodiments, from the perspective of the file system, since snapshot based restoration of deleted file system objects may be treated similar to creating new file system objects, the file system may assign new LINs for all restored file system objects. In at least one of the various embodiments, since the LIN map may have mappings in terms of the old LINs the snapshot restore processes on both primary file system clusters and secondary file system clusters may each maintain an additional LIN map that maps old LINs to new LINs for restored files.

In at least one of the various embodiments, a LIN map synchronization phase may be employed to exchange old-to-new LIN mappings between primary file system clusters and secondary file system clusters. In at least one of the various embodiments, this may provide the file systems clusters an opportunity send a query to another file system cluster to determine LINs for which the remote equivalent may be unknown. In at least one of the various embodiments, the set of restored LINs may be different for each file system cluster, so this exchange may happen bi-directionally.

Generalized Operations

Figure 9:
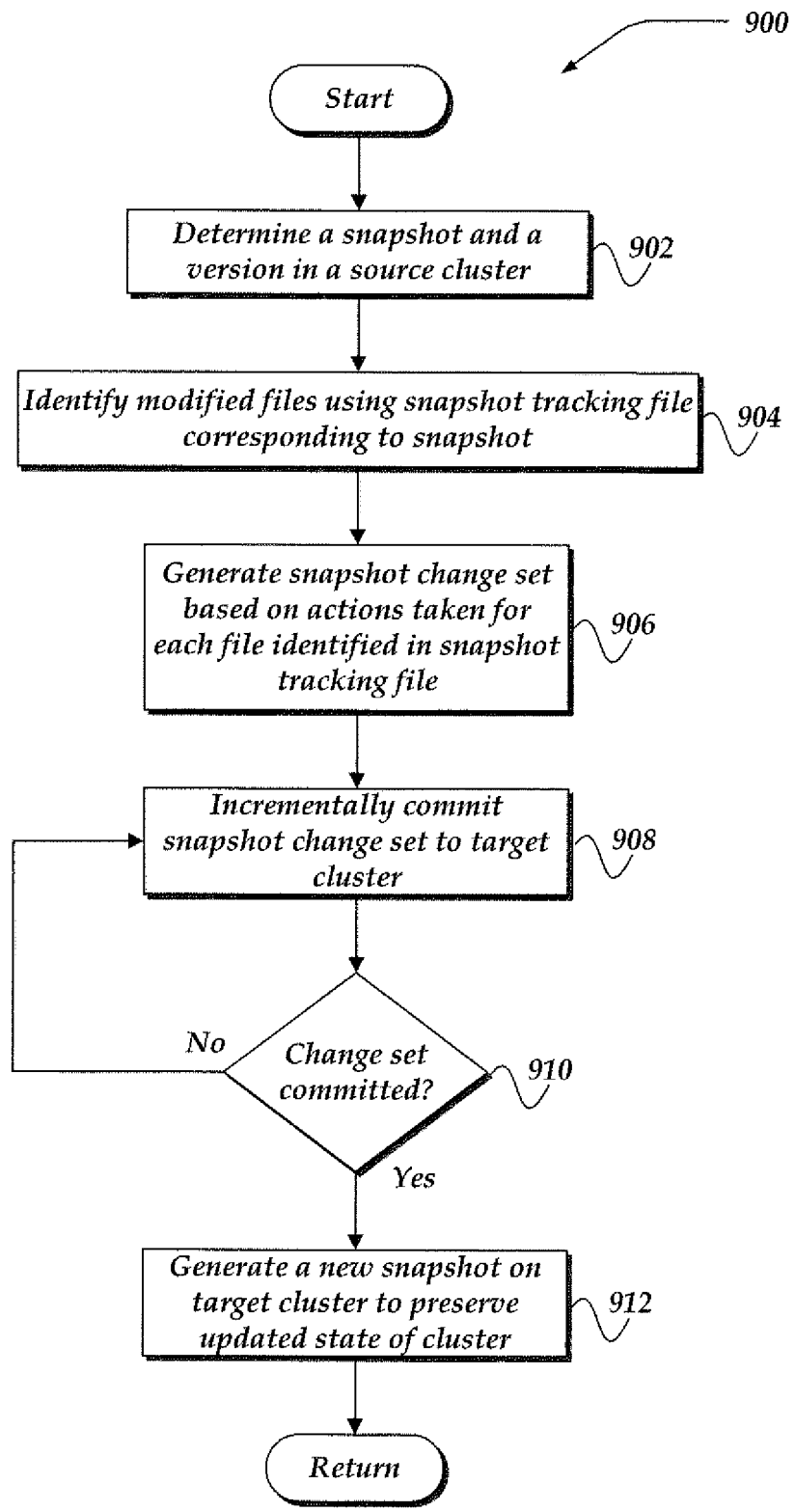
FIG. 9 shows a flow chart for a process of restoring/replication changes between snapshots in accordance with at least one of the various embodiments.

FIG. 9 shows a flow chart for process 900 of restoring/replicating changes to a file system made in between snapshots in accordance with at least one of the various embodiments. After a start block, at block 902, in at least one of the various embodiments, determine a snapshot and a version in the file system cluster. In at least one of the various embodiments, the file system cluster may be the source of a restoration and/or replication operation. In at least one of the various embodiments, a first and second snapshot in the source cluster may be determined wherein the second snapshot demarks a version of the file system.

At block 904, in at least one of the various embodiments, identify modified files using the snapshot tracking file corresponding to the snapshot.

At block 906, in at least one of the various embodiments, generate a snapshot change set based on the actions taken for each file identified in the snapshot tracking file.

At block 908, in at least one of the various embodiments, incrementally commit the snapshot change set to the target file system cluster. In at least one of the various embodiments, each change in the snapshot change set may be committed to the target file system cluster.

In at least one of the various embodiments, in some cases, the source file system cluster and the target file system cluster may be the same file system cluster. For example, in at least one of the various embodiments, the source file system cluster and the target file system cluster may be the same file cluster if restoring to a snapshot/version.

In at least one of the various embodiments, RRA 422 may be configured to execute/commit the file system object changes included in a snapshot change in a particular order. In at least one of the various embodiments, order may be changed based on the characteristics of particular file system. In at least one of the various embodiments, RRA 422 may first execute/commit the delete changes (e.g., changes may correspond to the deletion of file system object), followed by changes associated with hard links (e.g., moves and directory creates), and finally inode meta-data changes (e.g., block count updates, size, last access time, or the like) and data updates.

At decision block 910, in at least one of the various embodiments, if the snapshot change set has been successfully committed to the target file system cluster, control may move to block 912. Otherwise, in at least one of the various embodiments, control may loop back to block 908 to continue the incremental commit process.

In at least one of the various embodiments, each snapshot change set may include one or more changes to any given file system object. Accordingly, in at least one of the various embodiments, for some file system objects, committing a snapshot change set may result in more than one change being applied.

Also, in at least one of the various embodiments, if a file system cluster is being restored to a version or a snapshot committing the snapshot change set result in the reversal of one or more changes that were made to the file.

In at least one of the various embodiments, if a delete of a file system object is being reversed by RRA 422, the data to restore the file system object may be retrieved from the snapshot and stored/regenerated into the file system cluster.

At block 912, in at least one of the various embodiments, the target cluster may generate a snapshot that corresponds to the committed changes from the snapshot change set. Next, in at least one of the various embodiments, control may be retuned to a calling process.

In at least one of the various embodiments, the snapshot tracking file may be restricted to include LIN's of file system objects that have been modified. Thus, in at least one of the various embodiments, the operational/performance load of the replication/restoration process grows based on the number of changes made between the file system cluster versions, independent from the number of files in the file system.

Figure 10:
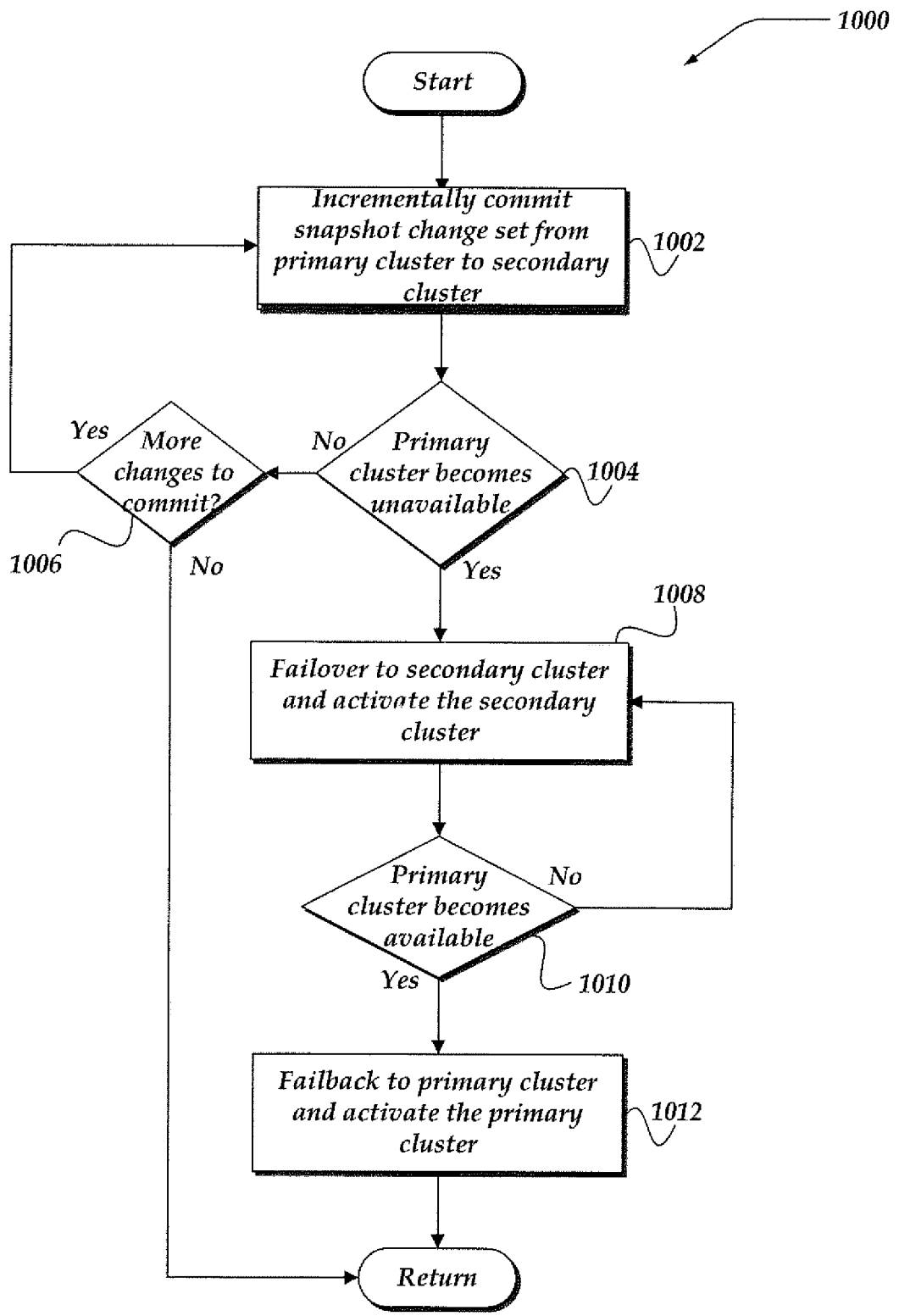
FIG. 10 shows a flow chart for a process of failover and failback between a primary file system cluster and a secondary file system cluster.

FIG. 10 shows a flow chart for process 1000 of failover and failback between a primary file system cluster and a secondary file system cluster. After a start block, at block 1002, in at least one of the various embodiments, incrementally commit the snapshot change set from the primary file system cluster to the secondary file system cluster.

At decision block 1004, in at least one of the various embodiments, if the primary file system cluster becomes unavailable, control may move to block 1008. Otherwise, in at least one of the various embodiments, control may move to decision block 1006.

In at least one of the various embodiments, a primary file system cluster may become unavailable for various reasons such as, power failure, network failure, or the like.

At decision block 1006, in at least one of the various embodiments, if there may be changes in the snapshot change set to commit to the target file system cluster, control may loop back to block 1002. Otherwise, in at least one of the various embodiments, control may be returned to calling process.

At block 1008, in at least one of the various embodiments, failover from the primary file system cluster to the secondary file system cluster and activate the secondary file system cluster.

At decision block 1010, in at least one of the various embodiments, if the primary file system cluster becomes available, control may move to block 1012. Otherwise, in at least one of the various embodiments, control may loop back to block 1008.

At block 1012, in at least one of the various embodiments, failback from the secondary file system cluster to the primary file system cluster and activate the primary file system cluster if the failback completes. Next, in at least one of the various embodiments, control may be returned to a calling process.

Figure 11:
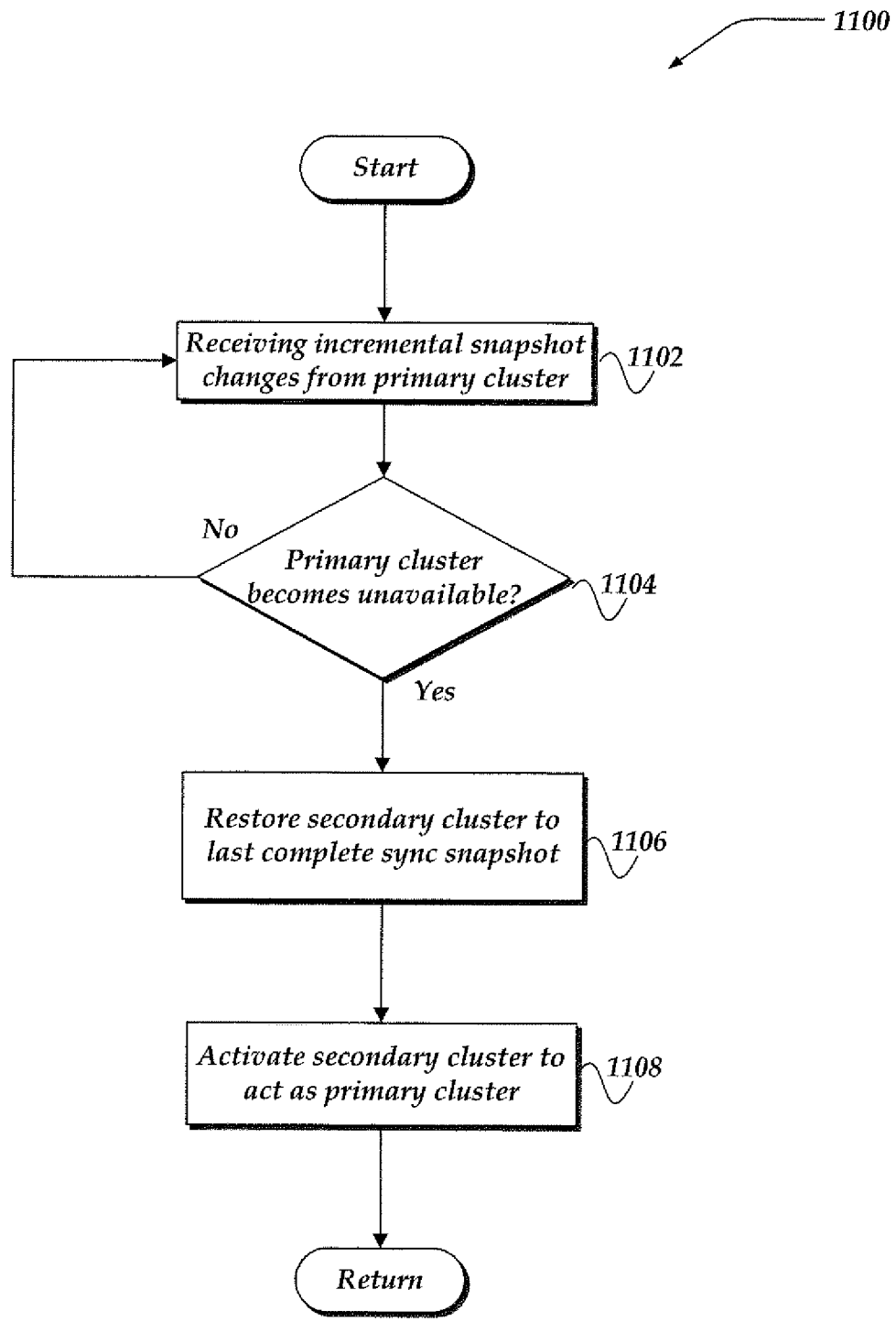
FIG. 11 shows a flow chart for a failover process in accordance with at least one of the various embodiments.

FIG. 11 shows a flow chart for process 1100 for failover in accordance with at least one of the various embodiments. After a start block, at block 1102, in at least one of the various embodiments, a snapshot delta data may be received from a primary file system cluster.

At decision block 1104, in at least one of the various embodiments, if the primary file system cluster may become unavailable during the incremental committing of a snapshot change set control may move to block 1106. Otherwise, in at least one of the various embodiments, control may loop back to block 1102.

In at least one of the various embodiments, the secondary file system cluster may have received a partial snapshot change set because some changes in the snapshot change set from the primary file system cluster remain uncommitted on the secondary file system cluster.

At block 1106, in at least one of the various embodiments, restore the state of the secondary file system cluster to the last complete synchronized snapshot.

In at least one of the various embodiments, the snapshot tracking file corresponding to the last synchronized snapshot on the secondary file system cluster may be used to generate a snapshot change set. This snapshot change set may be employed to restore the secondary file system cluster to the version/state that corresponds to the last synchronized snapshot.

In at least one of the various embodiments, because this may be a restore operation the changes in the snapshot change set may be applied to reverse the modification that were made to the file system objects.

At block 1108, in at least one of the various embodiments, activate the secondary file system cluster to begin providing file system services instead of the primary file system cluster. In at least one of the various embodiments, if the secondary file system cluster may be restored to a synchronized snapshot, it may begin providing file system services to users.

Figure 12:
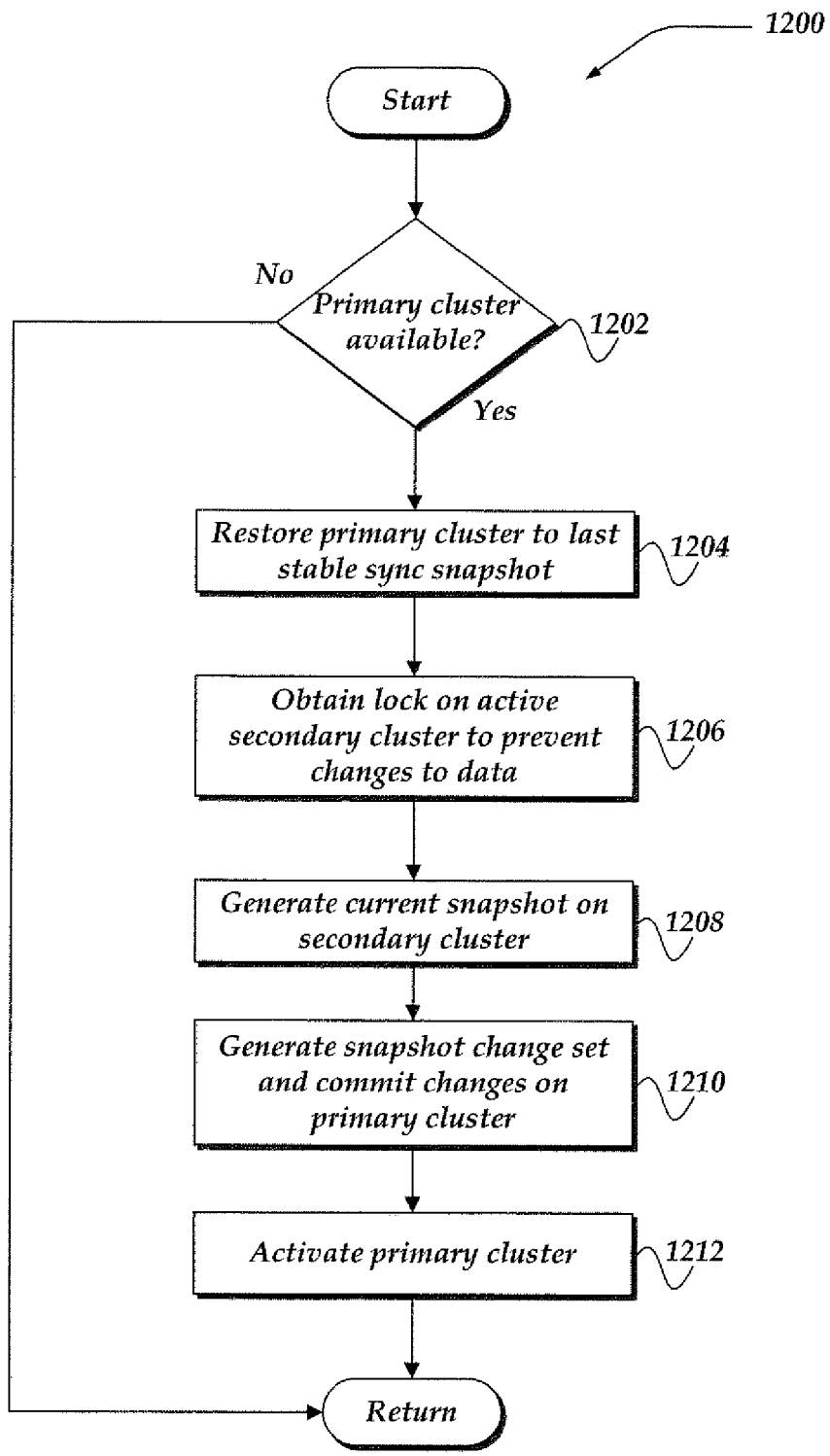
FIG. 12 shows a flow chart for a failback process in accordance with at least one of the various embodiments.

FIG. 12 shows a flow chart for process 1200 for failback process in accordance with at least one of the various embodiments. After a start block, at decision block 1202, if the primary file system cluster becomes available, control may move to block 1204. Otherwise, in at least one of the various embodiments, control may return to a calling process.

In at least one of the various embodiments, the primary file system cluster may become available if the reason(s) for its unavailability has been resolved (e.g., restoration of power). However, the primary file system may not be ready to activate because the secondary file system cluster may have been processing user file system requests/operations while the primary file cluster was unavailable.

In at least one of the various embodiments, the primary file system cluster needs to be synchronized with the secondary file system cluster before it may be activated.

At block 1204, in at least one of the various embodiments, restore the primary file system cluster to the last stable synchronized snapshot.

In at least one of the various embodiments, to establish a starting point for the synchronization process that primary file system cluster may restored to the last synchronized snapshot. This may be the last snapshot synchronized before the primary file system cluster became unavailable.

In at least one of the various embodiments, there may likely be data on the primary file system cluster that was not synchronized with the secondary file system cluster, this data may be discarded. In at least one of the various embodiments, the data may be discarded by performing a snapshot restore that reverses/undo's modification made to file system object subsequent to the last synchronized snapshot.

At block 1206, in at least one of the various embodiments, obtain a lock on the secondary file system cluster to prevent changes to the file system data during failback.

In at least one of the various embodiments, the failback process may be a controlled operation because it happens under the control of the users/administrators. Thus, in at least one of the various embodiments, the file system may be locked during to the failback process to establish data consistency between the primary file system cluster and the secondary file system cluster.

At block 1208, in at least one of the various embodiments, generate a current snapshot on the secondary file system cluster.

In at least one of the various embodiments, the failback process may synchronize the primary file system cluster with this current snapshot of the secondary file system. In at least one of the various embodiments, it may be used to establish a new baseline for mirroring between the two clusters.

At block 1210, in at least one of the various embodiments, generate a snapshot change set and incrementally commit the corresponding changes on the primary file system cluster.

In at least one of the various embodiments, this snapshot change set may include the changes to file system objects that may have occurred since the secondary file system cluster was activated (e.g., since the failover process). In at least one of the various embodiments, the secondary file system cluster may include intervening snapshots that were generated on the secondary file system cluster during the period when the primary file system was unavailable. If so, in at least one of the various embodiments, changes associated with these intervening snapshots may be restored on the primary file system cluster as well.

At block 1212, in at least one of the various embodiments, activate the primary file cluster. Also, in at least one of the various embodiments, the secondary file system cluster may be placed back into a mirroring/backup role. Next, control may be returned a calling process.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitive storage media, or the like.

The invention claimed is:

1. A method for managing at least one change in a file system for a plurality of network devices, wherein at least one network device is operative to perform actions, comprising:
    determining by a source file system cluster at least one snapshot and at least one version of a state of the source file system cluster, wherein each snapshot corresponds to a snapshot tracking file;
    determining at least one changed file system object that is in a snapshot tracking file that corresponds to a determined snapshot;
    generating at least one snapshot change set based on each change to each changed file system object in the snapshot tracking file wherein the at least one snapshot change set includes at least a deletion, a move, and an update;

incrementally committing the snapshot change set to at least one target file system cluster in the following order:
first, executing each change on the target file system cluster that corresponds to deleting at least one file system object;
second, executing each change on the target file system cluster that corresponds to moving at least one file system object, or generating at least one new file system object; and
third, executing each change on the target file system cluster that corresponds to updating at least one file system object; and if the snapshot change set is fully committed on the target file system cluster, generating at least one new snapshot for the target file system cluster that represents a state of the target file system cluster and also corresponds to the committed snapshot change set.

2. The method of claim 1 further comprising, if the source file system cluster is a primary file system cluster and the target file system cluster is a corresponding secondary file system cluster and the primary file system cluster is unavailable prior to fully committing the snapshot change set, perform further actions, comprising:
restoring the secondary file system cluster to a last synchronized snapshot; and
enabling the secondary file system cluster to provide file system services instead of the primary file system cluster.

3. The method of claim 1, further comprising, if the source file system cluster is a primary file system cluster and the target file system cluster is a corresponding secondary file system cluster and the primary file system cluster is available subsequent to enabling the secondary file system cluster to provide file system services instead of the primary file system cluster, perform further actions, comprising:
restoring the primary file system cluster to a last synchronized snapshot;
obtaining a lock on the secondary file system cluster, wherein the lock at least prevents a change to each file system object on the secondary file system cluster;
generating a failback snapshot change set based on at least each change made to at least each file system object in the secondary file system cluster since the last synchronized snapshot was generated;
fully committing each change in the failback snapshot change set to at least the primary file system cluster; and
enabling the primary file system cluster to provide file system services instead of the secondary file system cluster.

4. The method of claim 1, further comprising:
generating a logical inode (LIN) map on each file system cluster, wherein the LIN map on the source file system cluster and the LIN map on the target file system cluster are at least an inverse of each other; and
if the target file system cluster is separate from the source file system cluster, exchange LIN map data between the source file system cluster and the target file system cluster.

5. The method of claim 1, wherein committing the snapshot change set further comprises performing each change in reverse if the target file system cluster is being restored to the version that corresponds to the snapshot.

6. The method of claim 1, further comprising at least one of:
enabling the source file system cluster and the target file system cluster to operate on the same network devices; and
enabling the source file system cluster and the target file system cluster to operate in the same file system cluster.

7. A plurality of file system clusters, including a source file system cluster and a target file system cluster, for managing at least one change in a file system over a network, wherein file system clusters among the plurality of file system clusters include at least one storage device and at least one hardware processor configured to:
determine by the source file system cluster at least one snapshot and at least one version of a state of the source file system cluster, wherein each snapshot corresponds to a snapshot tracking file;
determine by the source file system cluster at least one changed file system object that is in a snapshot tracking file that corresponds to a determined snapshot;
generate by the source file system cluster at least one snapshot change set based on each change to each changed file system object in the snapshot tracking file wherein the at least one snapshot change set includes at least a deletion, a move, and an update;
incrementally commit the snapshot change set to the target file system cluster in the following order:
first, executing each change on the target file system cluster that corresponds to deleting at least one file system object;
second, executing each change on the target file system cluster that corresponds to moving at least one file system object, or generating at least one new file system object; and
third, executing each change on the target file system cluster that corresponds to updating at least one file system object; and
in response to fully committing the snapshot change set to the target file system cluster, generate at least one new snapshot for the target file system cluster that represents a state of the target file system cluster and also corresponds to the committed snapshot change set.

8. The plurality of file system clusters of claim 7, further comprising, if the source file system cluster is a primary file system cluster and the target file system cluster is a corresponding secondary file system cluster and the primary file system cluster is unavailable prior to fully committing the snapshot change set, perform further actions, comprising:
restore the secondary file system cluster to a last synchronized snapshot; and
enable the secondary file system cluster to provide file system services instead of the primary file system cluster.

9. The plurality of file system clusters of claim 7, further comprising, if the source file system cluster is a primary file system cluster and the target file system cluster is a corresponding secondary file system cluster and the primary file system cluster is available subsequent to enabling the secondary file system cluster to provide file system services instead of the primary file system cluster, perform further actions, comprising:
restore the primary file system cluster to a last synchronized snapshot;
obtain a lock on the secondary file system cluster, wherein the lock at least prevents a change to each file system object on the secondary file system cluster;

generate a failback snapshot change set based on at least each change made to at least each file system object in the secondary file system cluster since the last synchronized snapshot was generated;

fully commit each change in the failback snapshot change set to at least the primary file system cluster; and enable the primary file system cluster to provide file system services instead of the secondary file system cluster.

10. The plurality of file system clusters of claim 7, further comprising:

generate a logical inode (LIN) map on each file system cluster, wherein the LIN map on the source file system cluster and the LIN map on the target file system cluster are at least an inverse of each other; and if the target file system cluster is separate from the source file system cluster, exchange LIN map data between the source file system cluster and the target file system cluster.

11. The plurality of file system clusters of claim 7, wherein committing the snapshot change set further comprises performing each change in reverse if the target file system cluster is being restored to the version that corresponds to the snapshot.

12. The plurality of file system clusters of claim 7, further comprising at least one of:

enable the source file system cluster and the target file system cluster to operate on the same network devices; and enable the source file system cluster and the target file system cluster to operate in the same file system cluster.

13. A processor readable non-transitory storage media with instructions for managing at least one change in a file system for a plurality of file system clusters over a network, wherein execution of the instructions by a processor enables actions, comprising:

Determining by a source file system cluster at least one snapshot and at least one version of a state of the source file system cluster, wherein each snapshot corresponds to a snapshot tracking file;

determining at least one changed file system object that is in a snapshot tracking file that corresponds to a determined snapshot;

generating at least one snapshot change set based on each change to each changed file system object in the snapshot tracking file wherein the at least one snapshot change set includes at least a deletion, a move, and an update;

incrementally committing the snapshot change set to a target file system cluster in the following order:

first, executing each change on the target file system cluster that corresponds to deleting at least one file system object;

second, executing each change on the target file system cluster that corresponds to moving at least one file system object, or generating at least one new file system object; and third, executing each change on the target file system cluster that corresponds to updating at least one file system object; and if the snapshot change set is fully committed on the target file system cluster, generating at least one new snapshot for the target file system cluster that represents a state of the target file system cluster and also corresponds to the committed snapshot change set.

14. The media of claim 13, further comprising, if the source file system cluster is a primary file system cluster and the target file system cluster is a corresponding secondary file system cluster and the primary file system cluster is unavailable prior to fully committing the snapshot change set, perform further actions, comprising:

restoring the secondary file system cluster to a last synchronized snapshot; and enabling the secondary file system cluster to provide file system services instead of the primary file system cluster.

15. The media of claim 13, further comprising, if the source file system cluster is a primary file system cluster and the target file system cluster is a corresponding secondary file system and the primary file system cluster is available subsequent to enabling the secondary file system cluster to provide file system services instead of the primary file system cluster, perform further actions, comprising:

restoring the primary file system cluster to a last synchronized snapshot;

obtaining a lock on the secondary file system cluster, wherein the lock at least prevents a change to each file system object on the secondary file system cluster;

generating a failback snapshot change set based on at least each change made to at least each file system object in the secondary file system cluster since the last synchronized snapshot was generated;

fully committing each change in the failback snapshot change set to at least the primary file system cluster; and enabling the primary file system cluster to provide file system services instead of the secondary file system cluster.

16. The media of claim 13, further comprising:

generating a logical inode (LIN) map on each file system cluster, wherein the LIN map on the source file system cluster and the LIN map on the target file system cluster are at least an inverse of each other; and if the target file system cluster is separate from the source file system cluster, exchange LIN map data between the source file system cluster and the target file system cluster.

17. The media of claim 13, wherein committing the snapshot change set further comprises performing each change in reverse if the target file system cluster is being restored to the version that corresponds to the snapshot.

18. The media of claim 13, further comprising at least one of:

enabling the source file system cluster and the target file system cluster to operate on the same network devices; and enabling the source file system cluster and the target file system cluster to operate in the same file system cluster.

* * * * *